(12) United States Patent
Vanderploeg et al.

(10) Patent No.: US 7,291,305 B2
(45) Date of Patent: Nov. 6, 2007

(54) SIDE SHUTTLE APPARATUS AND METHOD FOR AN INJECTION MOLDING MACHINE

(75) Inventors: James A. Vanderploeg, Dutton (CA); Jacek Kalemba, Oakville (CA); Nicholas Seston, Rosemont (CA)

(73) Assignee: Husky Injection Molding Systems Ltd. (CA)

( * ) Notice: Subject to any disclaimer, the term of this patent is extended or adjusted under 35 U.S.C. 154(b) by 386 days.

(21) Appl. No.: 11/132,450

(22) Filed: May 19, 2005

(65) Prior Publication Data
US 2005/0271765 A1 Dec. 8, 2005

Related U.S. Application Data

(63) Continuation-in-part of application No. 10/287,809, filed on Nov. 5, 2002, now abandoned.

(51) Int. Cl.
*B29C 45/40* (2006.01)
(52) U.S. Cl. .................. 264/334; 425/126.1; 425/556; 425/588; 425/444
(58) Field of Classification Search ............. 425/126.1, 425/556, 588, 444; 264/334, 328.1
See application file for complete search history.

(56) References Cited

U.S. PATENT DOCUMENTS

| | | | |
|---|---|---|---|
| 3,734,666 A * | 5/1973 | Guest et al. ................ | 425/186 |
| 3,767,342 A * | 10/1973 | Potter et al. ................ | 425/157 |
| 3,784,261 A | 1/1974 | Potter et al. | |
| 3,947,208 A * | 3/1976 | Broderick ................ | 425/436 R |
| 4,204,824 A * | 5/1980 | Paradis ........................ | 425/444 |
| 4,243,364 A * | 1/1981 | Rees et al. .................. | 425/556 |
| 4,340,352 A | 7/1982 | Hayberg | |
| 4,351,630 A | 9/1982 | Hayberg et al. | |
| 4,368,018 A * | 1/1983 | Rees et al. .................. | 425/138 |
| 4,589,840 A | 5/1986 | Schad | |
| 4,616,992 A | 10/1986 | Oles | |
| 4,679,997 A | 7/1987 | Plenzler et al. | |
| 4,781,571 A * | 11/1988 | Heindl et al. ................ | 425/556 |
| 4,784,592 A | 11/1988 | Dromigny | |
| 4,915,611 A * | 4/1990 | Brown ........................ | 425/556 |
| RE33,237 E | 6/1990 | Deifer, III | |
| 4,976,603 A | 12/1990 | Disimone | |
| 5,037,597 A * | 8/1991 | McGinley et al. .......... | 264/334 |
| 5,234,328 A | 8/1993 | Willson et al. | |
| 5,295,802 A | 3/1994 | Hersbt | |

(Continued)

Primary Examiner—James P. Mackey
(74) Attorney, Agent, or Firm—Katten Muchin Rosenman LLP

(57) ABSTRACT

Servo side shuttle apparatus and method for a molding machine includes structure and/or steps whereby a shuttle plate has a portion always disposed inboard of a perimeter of a first mold half of the molding machine. Drive structure is preferably configured to drive the shuttle plate only in one plane across a molding face of the first mold half. A plurality of gripping structures are coupled to the shuttle plate and are respectively configured to remove a corresponding plurality of molded articles from a corresponding plurality of mold cavities (or cores). The drive structure is also configured to drive the shuttle plate to cause the plurality of gripping structures to be moved in a direction which is diagonal with respect to an array direction of the plurality of mold cavities (or cores).

38 Claims, 26 Drawing Sheets

U.S. PATENT DOCUMENTS

| | | |
|---|---|---|
| 5,518,387 A | 5/1996 | Di Simone |
| 5,520,876 A | 5/1996 | Dobler |
| 5,527,173 A | 6/1996 | Miller et al. |
| 5,527,174 A | 6/1996 | Godin et al. |
| 5,709,833 A | 1/1998 | Simone |
| 6,264,419 B1 | 7/2001 | Schinzel |
| 6,485,285 B1 | 11/2002 | Shiotani |
| 2004/0052891 A1 | 3/2004 | Kalemba et al. |

* cited by examiner

SIDE SHUTTLE APPARATUS AND METHOD FOR AN INJECTION MOLDING MACHINE

This application is a continuation-in-part of application Ser. No. 10/287,809, filed 5 Nov. 2002, now abandoned.

BACKGROUND OF THE INVENTION

1. Field of the Invention

The present invention relates to apparatus and method for performing operations on one or more molded articles in one or more mold cavities and/or mold cores. More particularly, the present invention relates to a side shuttle apparatus and method whereby various in-mold operations (such as extracting the plastic molded articles from their mold cavities or cores, applying labels to the plastic molded articles, providing various inserts into the mold cavity, closing or moving a cap of a molded container, etc.) can be quickly and easily carried out.

2. Related Art

In the injection molding art, it is desirable to carry out various operations on the just-molded plastic articles while they are still resident (or partially resident) in their respective mold cavities (or on their respective mold cores). For example, it would be advantageous to provide structure for removing the just-molded articles, for adding product labels, for providing various structural inserts, for rotating or manipulating the molded article in some way, conducting part inspection using a vision system, in-mold decoration (e.g. priming, painting), transfer molded articles from one molding position to another for progressive cavity molding, applying a barrier layer (e.g. oxygen scrubbing agent, etc.).

It would also be advantageous to provide structure to support pre-molding operations such as conditioning of the mold or molding inserts (e.g. heat and/or cool molding surfaces, apply a mold release agent, clean molding inserts and vents using dry-ice cleaning, etc.). All such operations would require additional structure coupleable to the injection molding machine to perform one or more of these operations. Such structure would be embodied as an operative structure or tooling that is mounted to a generic transport structure for movement of the operative structure into and out-of the molding region to perform their respective functions. However, all such additional structure will add complexity, weight, maintenance requirements, and degrade injection molding cycle time.

For example, U.S. Pat. Nos. 4,976,603; 5,518,387; and 5,709,833 disclose a so-called Servo Swing Chute ("SSC") structure whereby parts are removed from mold cavities by tooling that is mounted to a swing arm transport structure so as to swing toward and away from the mold to remove the just-molded plastic articles from the mold cavities. These SWC structures are typically mounted outboard of the mold cavities. The operation of these swinging tools requires relatively more time to extract the molded parts thereby increasing the cycle time (i.e., additional time required to open the mold wide enough to permit the large swing radius dictated by either the swing arm and/or the molded article thereon).

The so-called side-entry robot/end-of-tool-arm ("EOAT") mechanism is another variety of transport structure for moving tooling across the face of the mold to perform certain post-mold operations. Such transport structure and tooling are situated outboard of the molds, typically adjacent the injection molding machine with the attendant size and weight disadvantages inherent in the fact that the tooling is of a size required to service an entire mold face (i.e., the tooling must reach across the entire face of the mold) and has a robust and relatively massive structure to accommodate the tooling over a relatively long translation stroke.

U.S. Pat. No. 5,527,173 discloses a molding apparatus including operative structure in the form of a carrier plate for receiving molded articles and holding inserts to be incorporated into the molded article, and further for transferring the inserts to the mold cores prior to molding. The carrier plate is intended for use mounted to a typical side-entry robot.

U.S. Pat. No. RE 33,237 discloses an improved carrier plate cooperating with an injection molding machine for handling hollow plastic articles from the molding cavities. Further, the structure and operation of the side-entry robot is contemplated, suggested configurations including a platen-mounted robot with pneumatically or servo driven tooling plate actuation, and with the further provision of a carrier plate to a mold alignment device.

U.S. Pat. Nos. 4,616,992, 4,679,997, and 4,784,592 are examples of known devices for placing labels in the blow molds of a blow-molding machine. The devices include a transfer assembly mounted on a side-entry robot that uses vacuum cups or grippers to transport the labels and/or blown article. However, these patents fail to disclose a sliding transport structure that can be advantageously mounted inboard of the mold.

U.S. Pat. No. 5,520,876 discloses a process and a device for injection molding plastic cups having a label-shaped enveloping sheet integrated therein. The label holder and handling device are of an integral construction, pivotably connected to the mold core half. This patents fails to disclose a sliding transport structure that can be advantageously mounted inboard of the mold.

U.S. Pat. Nos. 4,351,630 and 4,340,352 disclose a device for the in-mold closing of a lid of a cap. The device includes a finger mounted inboard of the mold which slides between the mold sections in an open position, and in the process, engages a portion of the article or the lid, rotates the portion or lid about the hinge, and snaps the lid shut. This patents fails to disclose a sliding transport structure that can be compactly mounted inboard of the mold.

Commonly assigned U.S. patent application Ser. No. 10/243,002, filed 13 Sep. 2002, and entitled "APPARATUS FOR CLOSING A HINGED MOLDED PART", discloses an apparatus and method for part removal from a mold and for the in-mold folding of a hinged molded part using a swing arm mechanism. This application does not, however, disclose a sliding transport structure that can be advantageously mounted inboard of the mold.

Thus, what is needed is a new transport structure and related tooling and/or method for performing various post-mold operations on just-molded plastic articles, which can reduce cycle time, reduce size and weight constraints, and offer great flexibility in the types of post-mold operations which can be carried out.

SUMMARY OF THE INVENTION

It is an advantage of the present invention to provide a side shuttle apparatus configured to be mounted inboard of a mold, and capable of translating across a mold face in order to position tooling thereon with respect to mold cavities/cores (or an auxiliary station (e.g. drop chute)) to perform various pre and post-mold operations, and a method of using such an apparatus, which overcomes the problems of prior art injection molding machines. The term "side" is not limiting as to the direction of movement of the shuttle structure. That is, the shuttle structure may move horizontally in horizontally-disposed molds, or may move vertically in vertically-disposed molds. Thus, the shuttle structure will move in a direction substantially parallel with the coplanar surfaces of the mold cavity and mold core faces.

According to a first aspect of the present invention, molding machine side shuttle structure and/or steps are provided whereby a shuttle plate has a portion always disposed inboard of a perimeter of a first mold half of the molding machine. A drive structure is configured to drive the shuttle plate only in one plane across a molding face of the first mold half. A plurality of gripping structures are coupled to the shuttle plate and are respectively configured to remove a corresponding plurality of molded articles from a corresponding plurality of mold cavities. The drive structure is configured to drive the shuttle plate to cause the plurality of gripping structures to be moved in a direction which is diagonal with respect to an array direction of the plurality of mold cavities According to a second aspect of the present invention, structure and/or steps are provided whereby a molded article removal apparatus includes a plate coupled to a first mold half of a molding machine and having a portion always disposed inboard of a perimeter of the first mold half. The plate includes a removal device that is configured to grasp the molded article from at least one of a mold core and a mold cavity. Drive structure is configured to be coupled to the plate, and is configured to drive the plate (i) such that the plate is driven simultaneously in two orthogonal coplanar linear directions, and (ii) such that the removal device removes the molded article from the at least one of the mold core and the mold cavity.

According to a third aspect of the present invention, structure and/or steps are provided whereby molded article removal apparatus includes a first shuttle plate configured to be coupled to a mold portion, and includes a first plurality of molded article gripping devices that are configured to remove a corresponding first plurality of molded articles from one of (i) a first plurality mold cores and (ii) a first plurality of mold cavities. A second shuttle plate is configured to be coupled to the mold portion, and includes a second plurality of molded article gripping devices that are configured to remove a corresponding second plurality of molded articles from one of (i) a second plurality mold cores and (ii) a second plurality of mold cavities. Drive structure is configured to be coupled to the mold portion, and is configured to drive the first and second plates in opposite directions, each opposite direction being diagonal to an array direction of one of (i) the first plurality mold cores and (ii) the first plurality of mold cavities.

According to a fourth aspect of the present invention, structure and/or steps are provided whereby a method of removing a plurality of molded articles from one of (i) an array of mold cavities, and (ii) an array of mold cores, includes the steps of: (a) driving a shuttle plate in between a mold core half and a mold cavity half to a position where a plurality of grippers coupled to the shuttle plate may remove the plurality of molded articles from the one of (i) the array of mold cavities, and (ii) the array of mold cores; (b) using the grippers to grip the molded articles and remove them from the one of (i) the array of mold cavities, and (ii) the array of mold cores; and (c) driving the shuttle plate in a direction diagonal an array direction of the one of (i) the array of mold cavities, and (ii) the array of mold cores, to a substantially co-linear position over a single drop chute.

BRIEF DESCRIPTION OF THE DRAWINGS

The advantageous structure and/or function according to the present invention will be more easily understood from the following detailed description of the preferred embodiments and the appended Drawings, as follows.

DETAILED DESCRIPTION OF THE PRESENTLY PREFERRED EXEMPLARY EMBODIMENTS

1. Introduction

Figure 1:
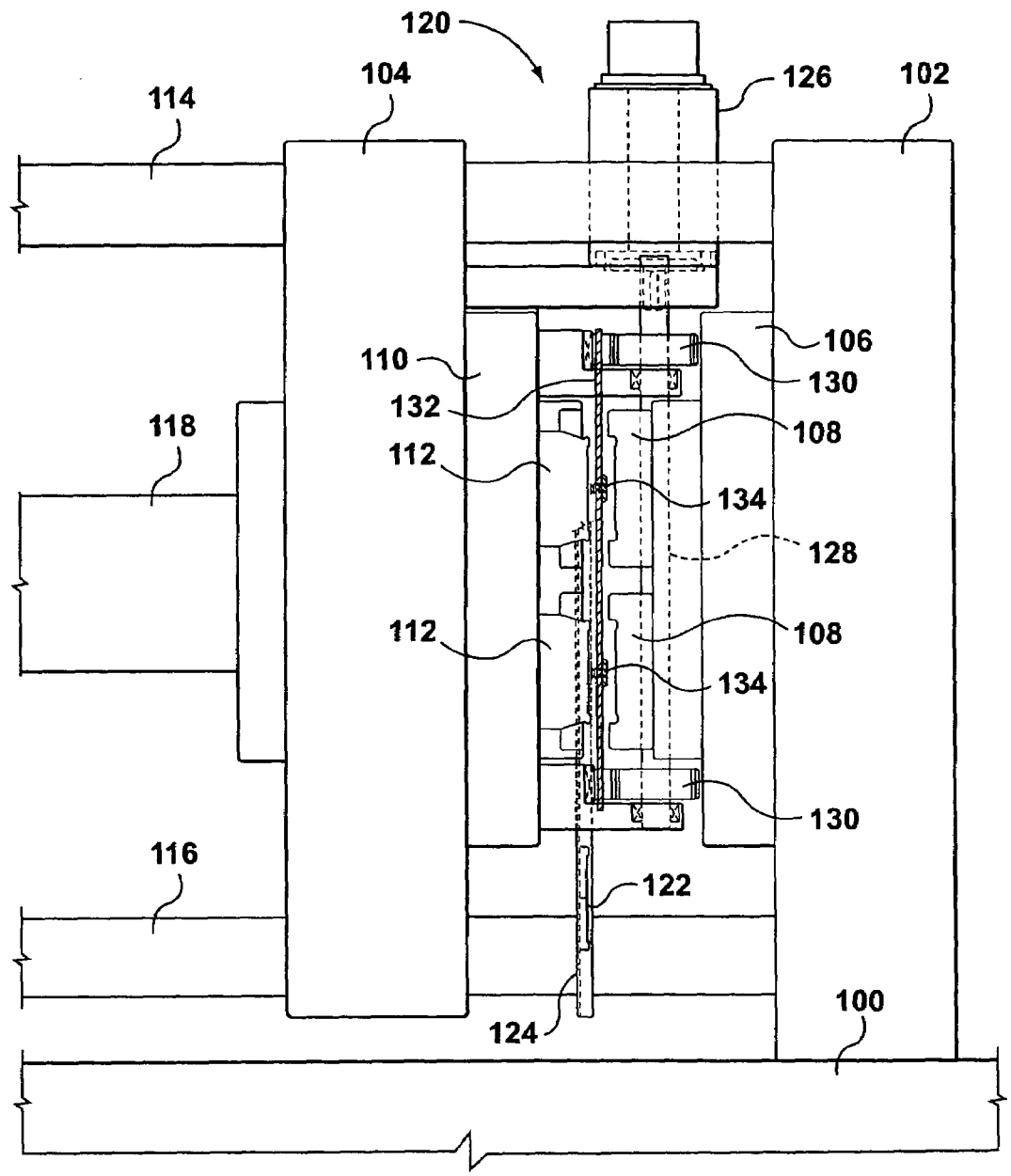
FIG. 1 is a schematic side view of an injection molding machine in which a servo side shuttle according to the present invention may be used.

The present invention will now be described with respect to embodiments in which a plastic injection molding machine includes a mold with an inboard-mounted side shuttle for numerous in-mold operations including finished molded article handling. These molding operations could be carried out in single face molds, stack molds, three and four level molds, etc. Indeed the present invention may find applicability in the molding operations in other kinds of molding such as stamping, die-cast, metal molding, etc., or anywhere efficient molded-part handling structures would be beneficial.

As a brief overview to assist in understanding the following detailed disclosure, the preferred embodiments include a shuttle plate connected to a first mold half by a guidance assembly for guiding the shuttle plate linearly across the molding face of the first mold half. The shuttle plate is driven by an appropriate motive means. The shuttle plate includes operations structure which can carry out various operations on the just-molded parts while those parts are still present in their respective cavities or on their respective mold cores, or operations on the mold cavities or cores before or after the liquid plastic has been injected into the cavities. For example, the shuttle plate could include suction cups which are used to extract the molded part from its mold core, move the molded part linearly, and drop the part into a drop chute. Likewise, the operations structure can insert a label into the mold cavity before the plastic is injected therein, and/or close the lid of a molded article that is resident on the mold core.

The shuttle plate is preferably disposed inboard of the mold half so that a small machine footprint is provided, and the shuttle plate may have a shorter distance to move. This results in a lighter weight and compact design that can be operated more quickly and hence reduces cycle time.

The servo side shuttle ("SSS") is configured to translate its tooling across the face of the mold (i.e. linear motion). The preferred in-board installation and related short stroke of the servo side shuttle provides for a compact and relatively light-weight design that again permits faster cycling and/or permits handling of higher cavitation molds at a lower cost relative to SSC and side-entry robot/EOAT (End Of Arm Tools) tools. Further, the preferred inboard side shuttle installation provides for improved tooling-to-mold cavity alignment for the sake of part handling and/or workpiece inserting (i.e. no losses due to robot-to-machine and/or mold-to-machine alignment).

Three embodiments of the present invention will now be described with respect to FIGS. 1-16, 17-20, and 21-23. FIGS. 2-16 show the servo side shuttle structure used to remove molded plastic articles from the mold, FIGS. 17-20 depict that structure used to close or move a lid on a molded plastic article and to remove it from the mold, and FIGS. 21-23 detail that structure used to place a label in a mold cavity for subsequent placement on a molded plastic article. However, the shuttle mechanisms described herein may be used for other in-mold operations such as inserting other molded or non-molded structures, plastic, composite, or metal into mold cavities or cores before, during, or after injection molding operations have been carried out, conducting part inspection using a vision system, in-mold decoration (e.g. priming, painting), pre-molding operations such as conditioning of the mold or molding inserts (e.g. heat and/or cool molding surface, apply a mold release agent, clean molding inserts and vents using dry dry-ice cleaning, transfer molded articles from one molding position to another for progressive cavity molding, applying a barrier layer (e.g. oxygen scrubbing agent), trimming or cutting the molded article, etc.). Furthermore, any and all of the above described operations may be carried out in any combination and in any sequence in order to mold and handle the parts in a desired way.

2. The Structure of the Molded Article Handling Tooling

FIG. 1 shows an injection molding machine comprising a base 100 which contains the various motors and controls necessary for operating the principal parts of the machine (not shown). A first platen 102 supports a mold cavity half comprising a plurality of mold cavities 108 (preferably disposed in a 1- or 2-dimensional array) mounted on mold cavity plate 106. A second platen 104 supports a mold core half comprising a plurality of mold cores 112 (also preferably disposed in a 1- or 2-dimensional array) mounted on mold core plate 110. The second platen 104 is slidably supported on upper and lower tie bars 114 and 116, and is moved reciprocally along the tie rods by a column 118. Depending upon the particular injection molding machine configuration, the first platen 102 may be stationary or it may be movable. A servo side shuttle tool 120 according to the present invention is disposed on one of the mold core plate 110 and the mold cavity plate 106. The shuttle tool 120 removes molded parts 122 from one of the mold cores 112 and the mold cavities 108 and deposits them in the drop chute 124. The servo side shuttle tool preferably includes a servo motor 126, a drive shaft 128, linear/rack mechanisms 130, shuttle plate 132, and suction members or cup 134.

Figure 2:
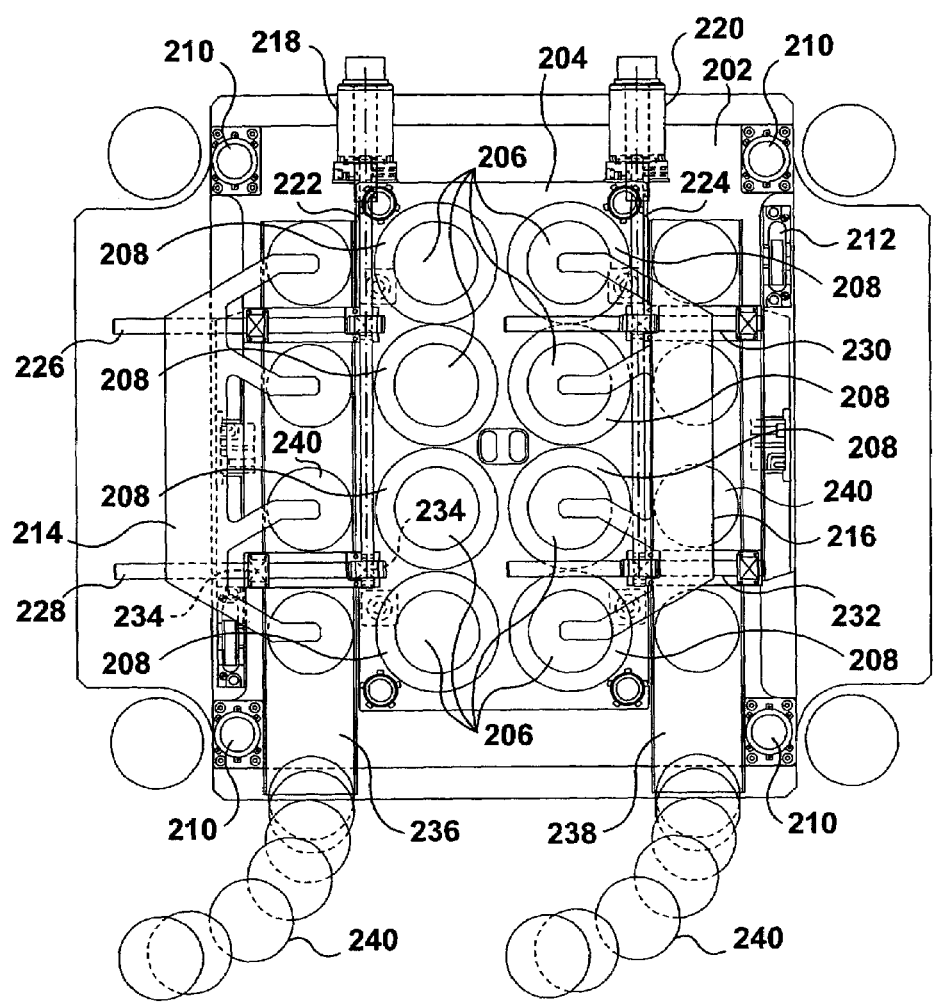
FIG. 2 is a plan view of a first embodiment of the servo side shuttle according to the present invention.

FIG. 2 is a plan view of an embodiment which is used to injection-mold plastic lids in a 4-level mold. The core plate 202 has a molding area 204 with eight mold cores 206. Stripper rings 208 surround the cores 206 and strip the molded articles off of the cores 206 in a manner to be described below. Support leader pins 210 are used to align the mold core plate (or "half") 202 with the mold cavity plate (or "half") (not shown). Harmonic linkage 212 is used to open several molds in a stack-mold configuration at the same time.

Shuttle plates 214 and 216 are disposed, respectively, on the left side and right side of the core plate 202. Each shuttle plate has four arms configured to extend over and cover corresponding ones of the cores 206. For illustration purposes only, the left side of FIG. 2 shows the shuttle plate 214 in the outboard or closed position, and the right side of FIG. 2 shows the shuttle plate 216 in the inboard or open position. In the outboard position, a portion of the shuttle plate extends outside of the perimeter of the core plate 202, while in the inboard position the shuttle plate is entirely within the core plate perimeter. Nevertheless, in both the mold open position and in the mold closed position, at least a portion of the shuttle plate is disposed within the perimeter of the core plate, as shown in FIG. 2. Of course, each shuttle plate may comprise one or more planar members, rectangular cross-section members, circular cross-section members, wires, cables, articulated members, and be made of metals, plastics, composites, etc.

Servo motors 218 and 220 respectively drive the shuttle plates 214 and 216 through respective drive shafts 222,224, and rack/linear rails 226,228 and 230,232. The servo motors 218 and 220, the drive shafts 222,224, and the rack/linear rails 226,228 and 230,232 are preferably coupled to the core plate and/or the cavity plate. Each rack/linear rail preferably includes one or more linear bearings 234, and is configured and disposed to guide the shuttle plate with a linear motion with respect to a mold surface of the core plate. Of course, any convenient drive/guidance structure may be adapted for use in driving the shuttle plates.

Each shuttle is driven linearly across the face of the core plate (and/or the cavity plate) between the inboard/open position (also called the pick position) where it picks the molded article from the core, and an outboard or open position (also called the drop position) where it drops the molded articles into drop chutes 236 and 238. In FIG. 2, numerous molded parts 240 are shown attached to shuttle plate 214, inside the drop chute 238, and exiting from both of the drop chutes 236 and, 238. The servo motors may be replaced/augmented by other drive mechanism such as mechanical drives, pneumatic drives, hydraulic drives, or drives coupled to the movement of the mold halves as they open and close. Also, the shuttle mechanism may be used to perform any desired operation on the molded article while the molded article is fully or partially resident on the mold core or the mold cavity. For example, a label may be applied to the exterior surface of a just-molded plastic container while that container is partially extracted from the mold cavity.

Figure 3:
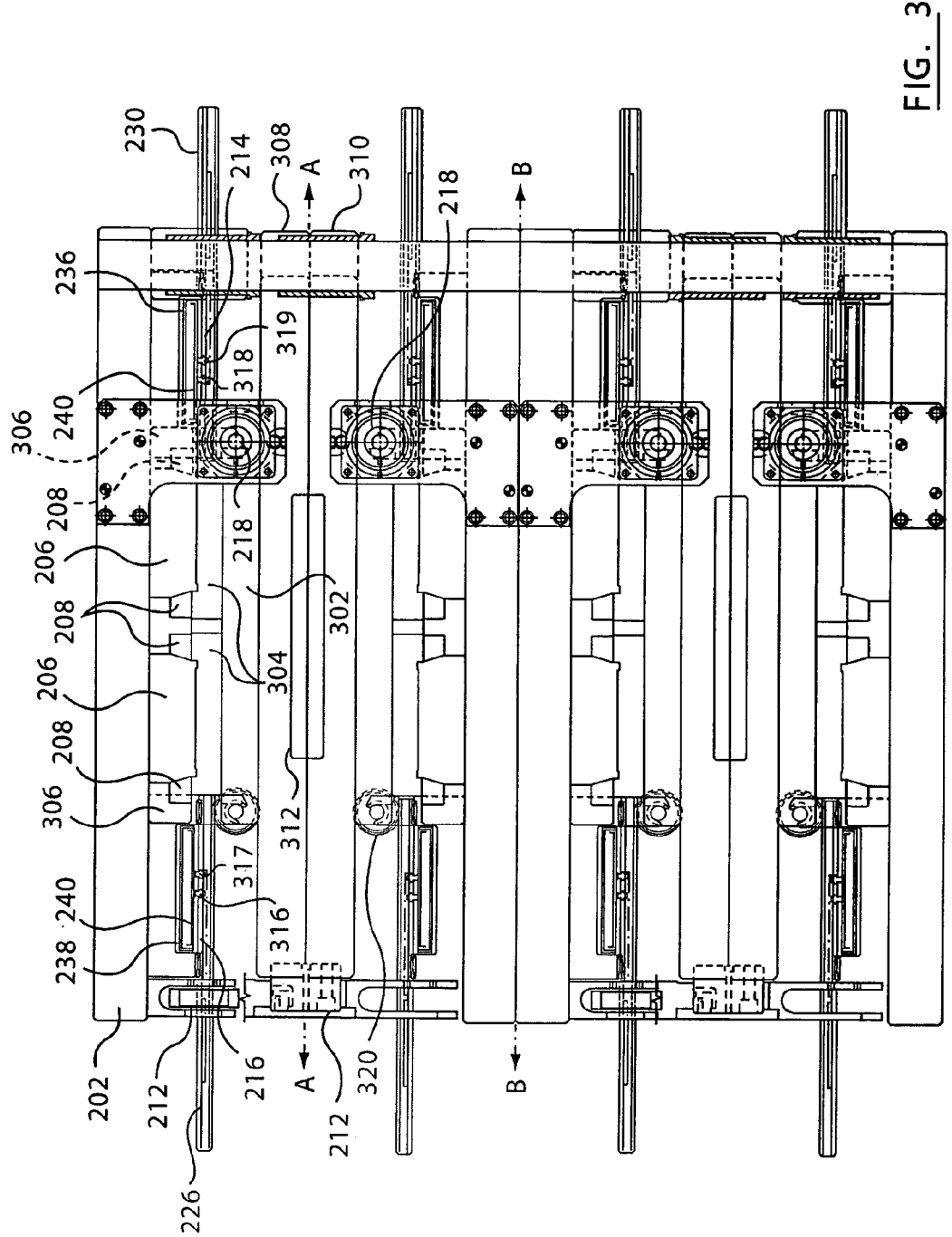
FIG. 3 is a top view of the first embodiment of the present invention.

FIG. 3 is a top view of the FIG. 2 embodiment showing the molds in the 4-level mold in the closed position. A core plate 202 holds cores 206, while a cavity plate 302 has cavities 304. Parts 240 are shown in their outboard positions while fresh parts 240 are being formed between the cores 206 and the cavities 304. A stripper plate 306 has stripper rings 208 which strip the parts 240 from the cores 206 when the core plate 202 is moved away from the cavity plate 302 by the mold opening structure. A first hot runner plate 308 and a second hot runner plate 310 hold a hot runner 312 in a known manner. Each of the pick positions on the shuttle plates 214 and 216 includes two suction cups 316,317 and 318,319, respectively. These suction cups are used to grasp the parts 240 from the cores 206. However, numerous equivalents to the suction cups may be used such as vacuum channels, mechanical grippers, adhesive layers, electrostatic attraction/repulsion, magnetic attraction/repulsion, etc.

The shuttle plates 214 and 216 are driven by the servomotors 218 and 222 to move linearly between the cores 206 and the drop chutes 236,238. Once positioned in the drop chutes, a vacuum is released and/or an interfering tab is disposed to drop the parts 240 into the drop chutes. Drive gears 320 are used to transmit the motion from drive shafts 222,224 to the rack/linear rails 226,228 and 230,232, respectively. In FIG. 3, a first mold section and a second mold section are symmetrical about line A-A, and the details of the second mold section will not be further described. Likewise, a first mold group and a second mold group are symmetrical about a line B-B, and the details of the second mold group will not be further described.

Figure 4:
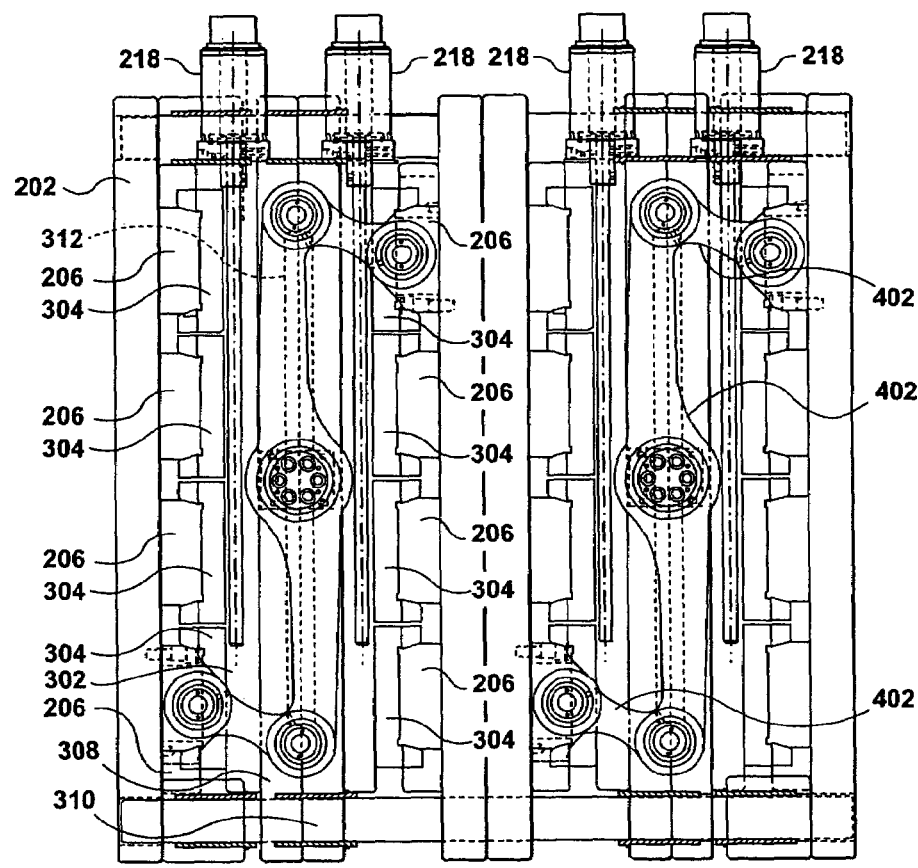
FIG. 4 is a side view of the first embodiment of the present invention.

FIG. 4 is a side view of the FIG. 2 embodiment showing the mold halves in the closed position. The figure shows the servo motor 218, the core plate 202, the cores 206, the cavity plate 302, the hot runner plates 308,310, and the hot runner 312. Secondary harmonic linkages 402 are used to transfer motion among the several pairs of mold core/cavity plates to ensure properly timed opening/closing of the mold plates.

Figure 5:
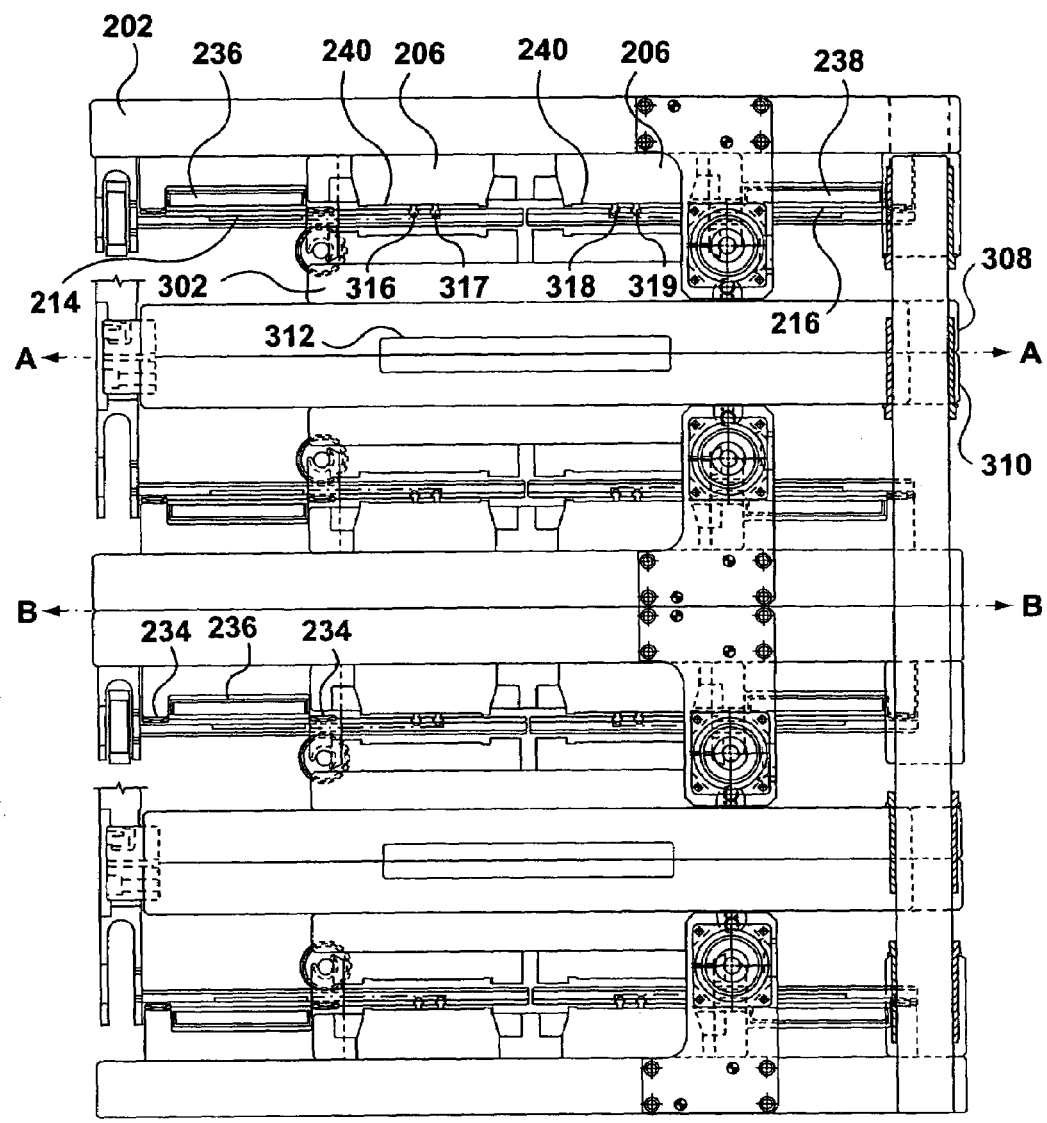
FIG. 5 is another top view of the first embodiment of the present invention.

FIG. 5 is a top view of the FIG. 2 embodiment showing the mold halves in the open position. In this position, the shuttle plates 214,216 move inboard to a position where their suction cups 316,317 and 318,319 can grasp parts 240 from the cores 206. Note the thin clearance (e.g. ~50 mm) between the open core plate 202 and the cavity plate 302. The rack/linear rail structures 226,228 and 230,232, and the shuttle plates 214,216 are configured to move within this narrow clearance to pick the parts 240 from the cores 206, retract to the drop position, and then drop the parts 240 into the drop chutes 236,238. This narrow clearance means that the mold halves do not have to open very much to effect part removal. FIG. 5 also shows that the linear bearings 234 are widely disposed on opposite sides of the drop chute 236, thus providing wide linear bearing support for the rack/linear rail 228.

Figure 6:
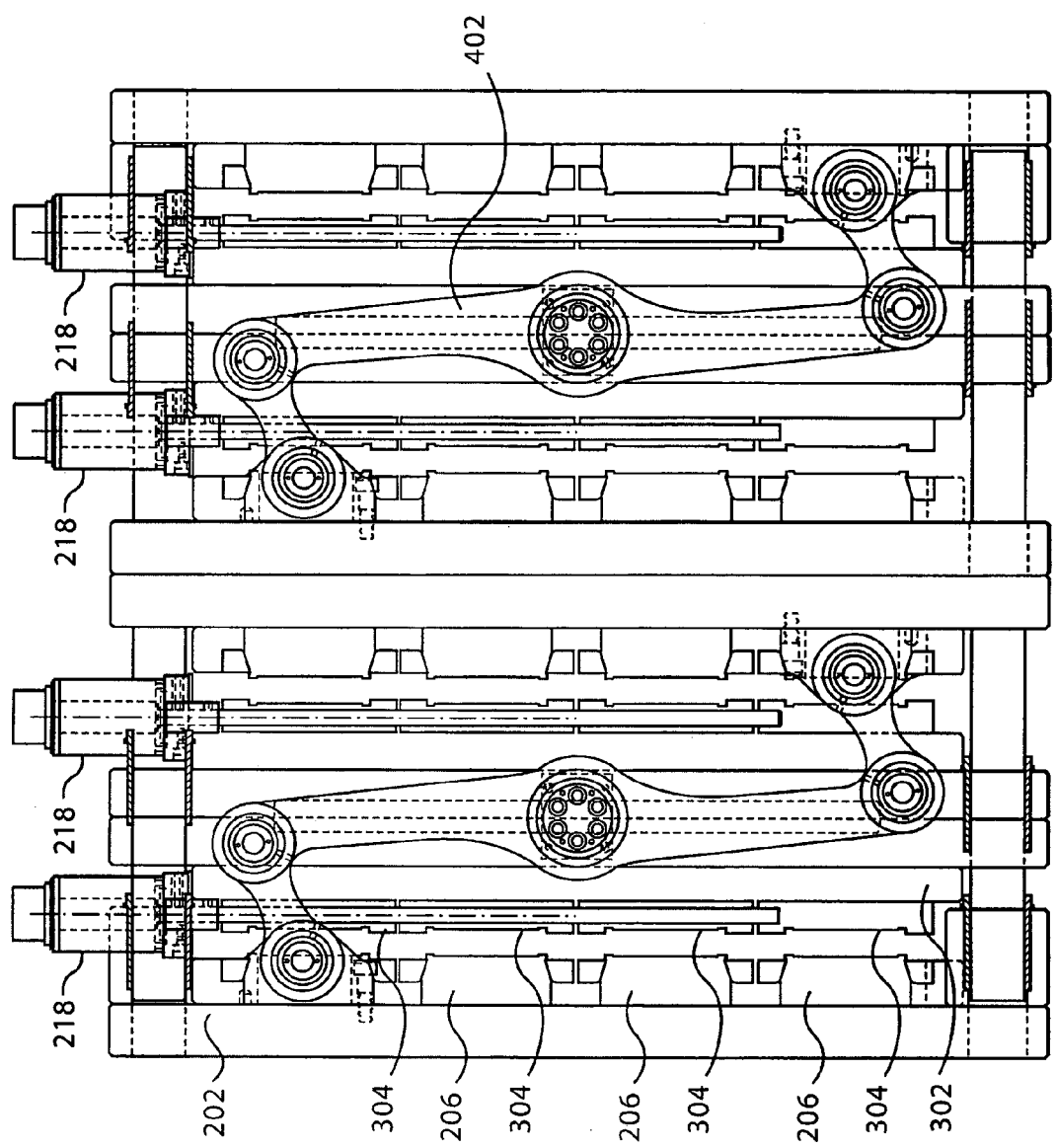
FIG. 6 is another side view of the first embodiment of the present invention.

FIG. 6 is a side view of the FIG. 2 embodiment showing the core plate 202 and the cavity plate 302 in the open position.

Figure 7:
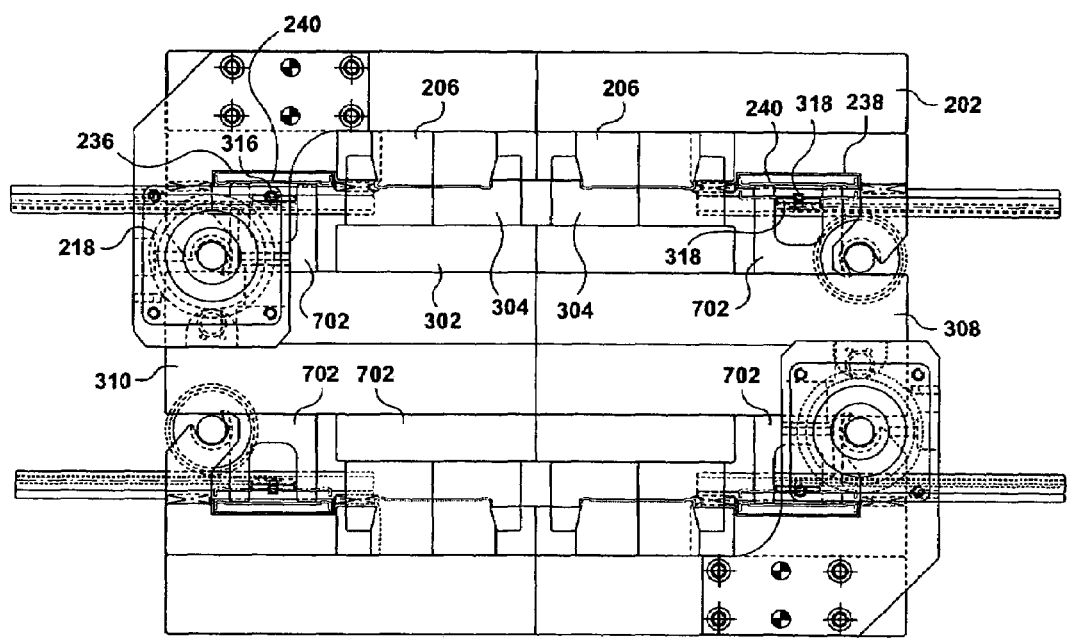
FIG. 7 is a top view of an alternative of the first embodiment of the present invention.

FIG. 7 shows an alternative to the FIG. 2 embodiment in a stack mold in which a U-shaped stripper bar 702 (a part of the mold) is used to strip the parts 240 from the shuttle plate suction cups 316,318 into the drop chutes 236,238. The stripper bar 702 may obviate the need for any vacuum channels and vacuum control structure to remove the parts 240 from the suction cups. The stripper bar 702 further forms a part of drop chutes 236,238 when the mold is closed, and is configured to guide the parts in the chute and hence eliminates possible interference between falling parts and the suction cups.

Figure 8:
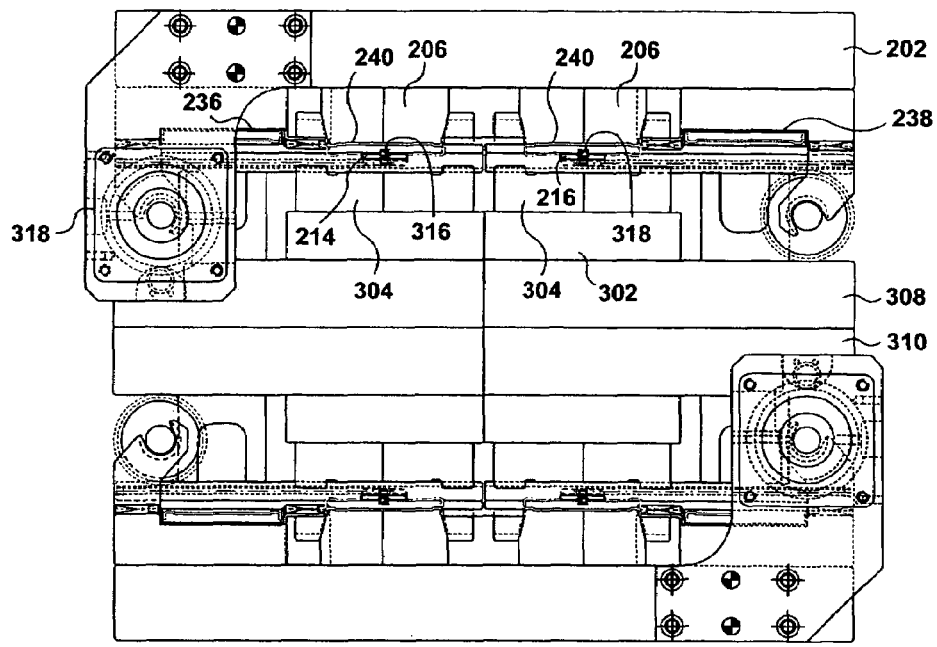
FIG. 8 is a top view of the FIG. 7 alternative.

FIG. 8 shows the FIG. 7 alternative in the open position. The shuttle plates 214,216 have been driven inboard to position their suction cups 316,318 adjacent the parts 240 in preparation for picking the parts 240 from the cores 206.

Figure 9:
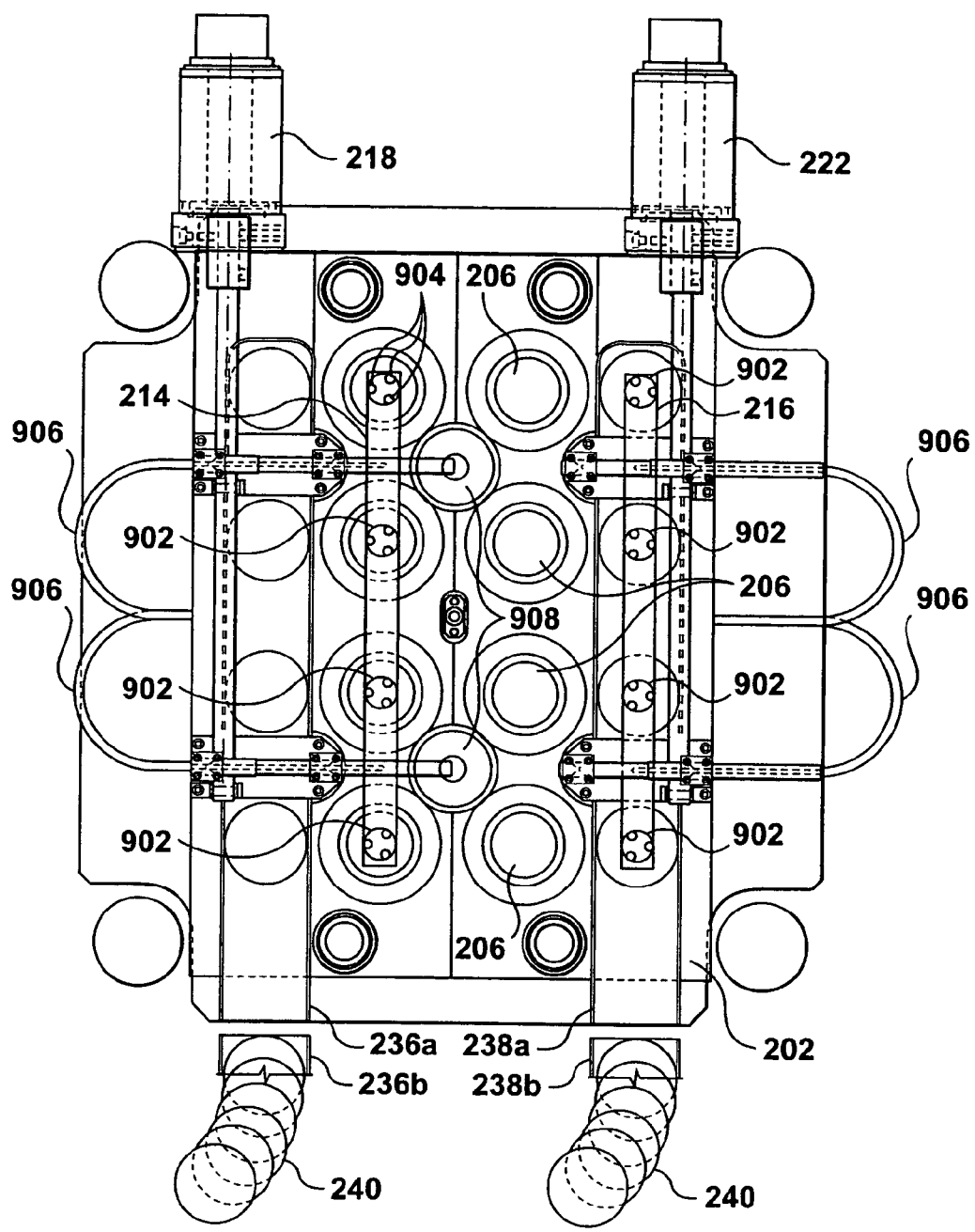
FIG. 9 is a plan view of the core plate in another alternative of the first embodiment of the present invention.

FIG. 9 is a plan view of the core plate 202 in another alternative of the FIG. 2 embodiment. In this alternative, shuttle plates 214,216 comprise relatively narrow rectangular plates, each of which holds four vacuum plates 902. Each vacuum plate 902 has three vacuum ports 904 therein for grasping the parts 240 by a vacuum force. Vacuum tubes 906 carry lower pressure air to the vacuum ports 904. A vacuum source (not shown) and control structure (e.g., a processor, solenoids, etc.) manage the vacuum in order to grasp and release the parts 240, as required. Stripper plate pistons 908 move the stripper plate in a known manner to strip the parts 240 from the cores 206. In this alternative, each of the drop chutes 236,238 has a movable portion 236a,238a that moves with the core plate 202, and a stationary portion 236b,238b that remains fixed with respect to the core plate 202.

Figure 10:
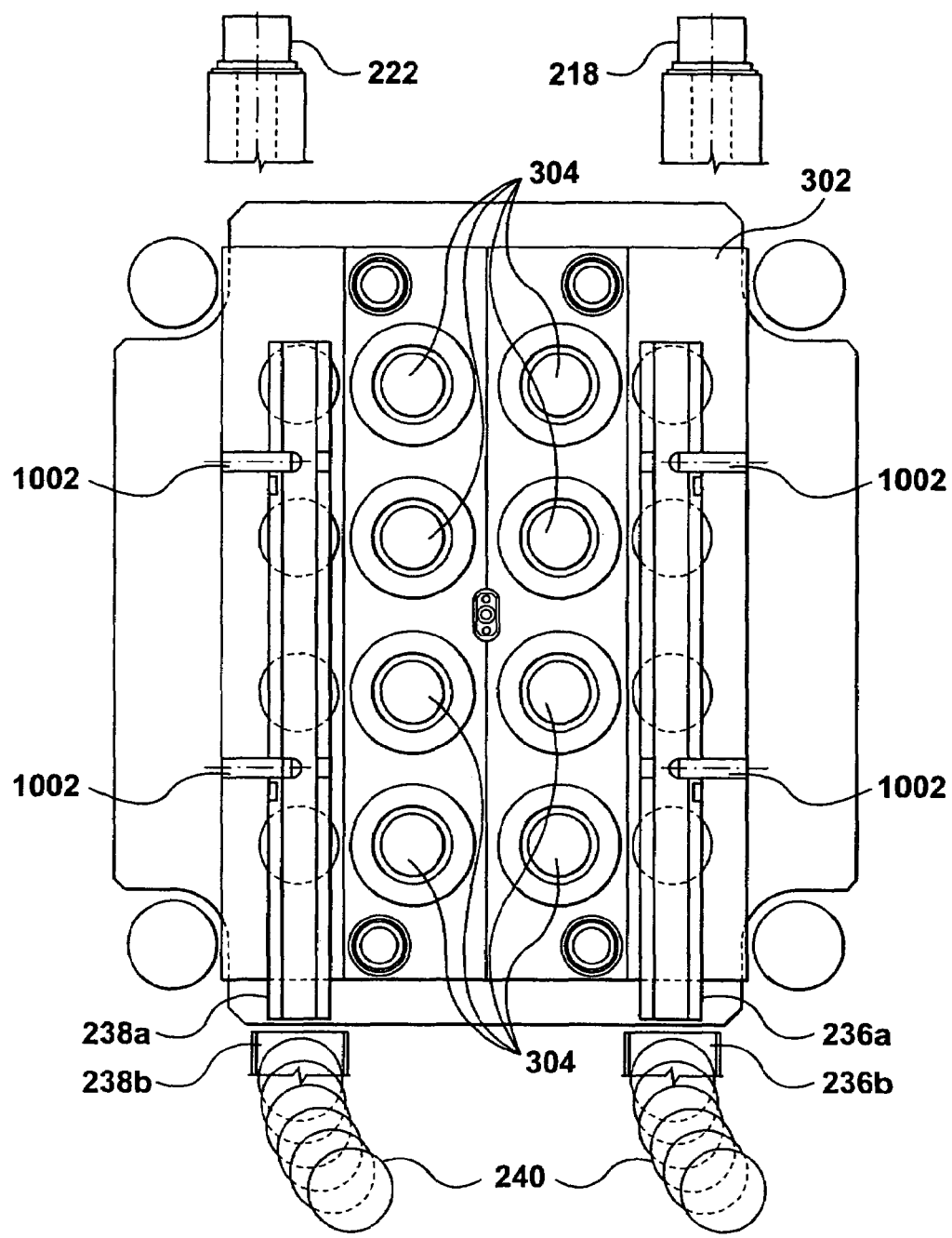
FIG. 10 is a plan view of the cavity plate of the FIG. 9 alternative.

FIG. 10 is a plan view of the cavity plate 302 in the FIG. 9 alternative. Note the cut-outs 1002 which form spaces for the gears of the shuttle plate drive mechanism to park when the mold halves are closed.

Figure 11:
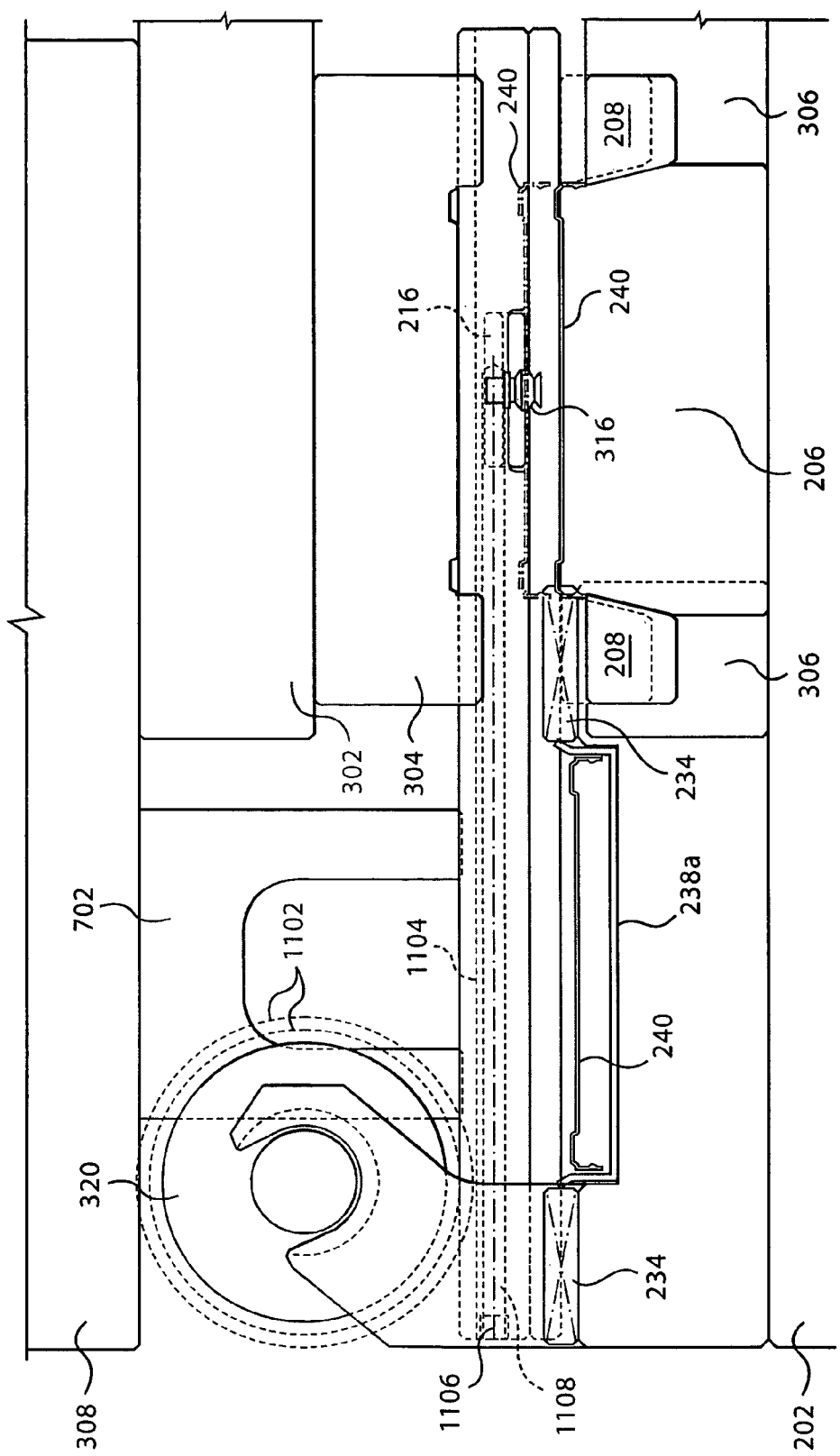
FIG. 11 is a drop detail view of the FIG. 9 alternative.

FIG. 11 is a close-up view of the drop details of the FIG. 9 alternative, showing the mold halves in the open position. The hot runner plate is adjacent the cavity plate 302, which holds the cavity 304. The core plate 202 holds the core 206 and is moved relative to the cavity plate 302. The stripper plate 306 moves the stripper ring 208, which is shown in the figure in its mold-closed position (solid line) and its mold-open position (dashed line). The shuttle plate 216 moves from left to right to position its vacuum ports 904 to grasp part 240 to be stripped from the core 240 by stripper ring 208 when the mold halves are open, the shuttle plate 216 (with part 240 attached) moves from right to left (supported by bearings 234) to a position above the drop chute 238a, and the mold halves again close (to mold the plastic part), the mold closing action causing stripper bar 702 to strip the part 240 from the suction cup 316 and drop into the drop chute 238a. The dashed lines 1102 and 1104 represent the outer limits of the gears which drive the shuttle plate 216. Dashed line 1106 represents a vacuum tube fitting, and dashed line 1108 represents the vacuum tubes that are conduits to the suction cups 316.

Figure 12:
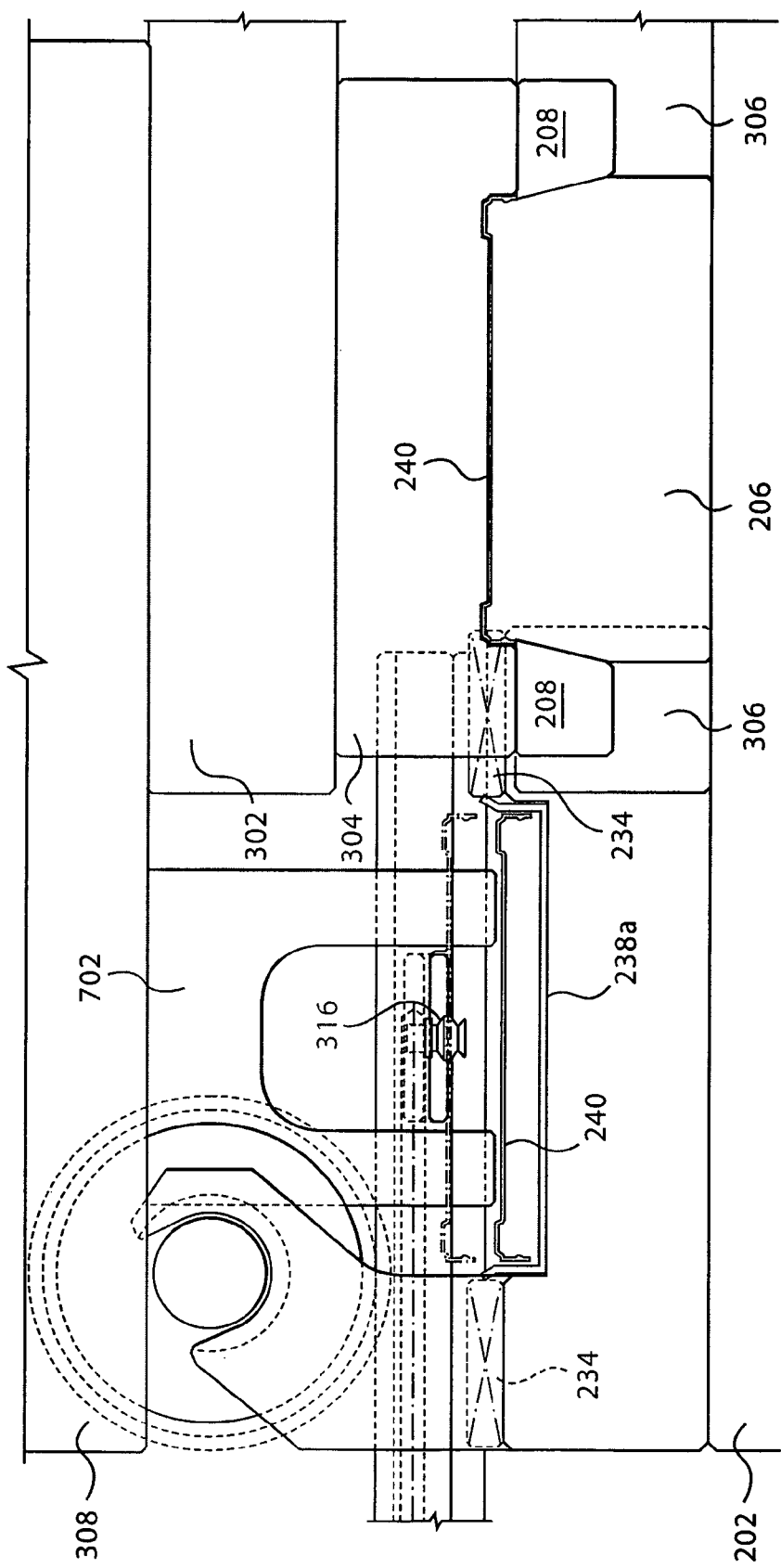
FIG. 12 is another drop detail view of the FIG. 9 alternative.

FIG. 12 is a close-up view of the drop details of the FIG. 9 alternative, showing the mold halves in the closed position. This figure clearly depicts how the stripper bar 702 pushes the part 240 from the shuttle plate suction cups 316, and drops it into the drop chute 238a. Note how the stripper bar 702 forms a portion of the drop chute to keep the parts 240 properly positioned in the drop chute 238a as they descend through the chute. Note also how the shuttle plate mechanisms fit well within the vertical clearance between the mold halves.

Figure 13:
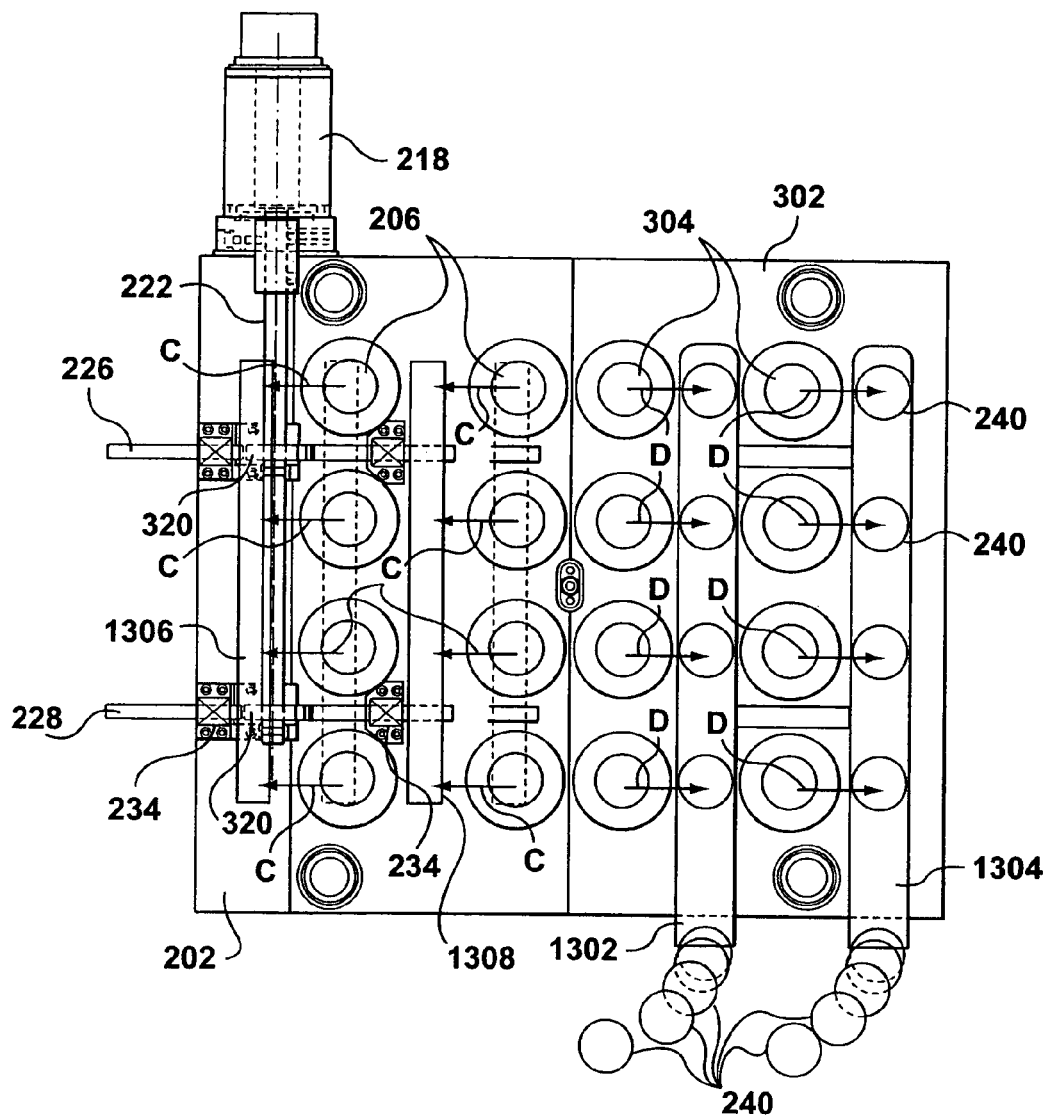
FIG. 13 is a combined core and cavity plan view schematic of another alternative of the first embodiment of the present invention.

FIG. 13 of another alternative of the FIG. 2 embodiment. For illustration purposes only, the left half of FIG. 13 shows a core plan view illustrating the part 240 transfer to the side shuttle 1306,1308, and the right half of FIG. 13 is that of the cavity plan illustrating the transfer of the part 240 to the drop chutes 1302,1304. In this alternative, each servo motor drives two shuttle plates, and thus serves two columns of cores. Of course, this alternative may be extended so that each servo motor may drive three or more shuttle plates. This alternative also allows two of the shuttle plates to be disposed inboard of the drop chutes and the cavities.

In more detail, the cavity plate 302 includes sixteen cavities 304 and four drop chutes (only the drop chutes 1302 and 1304 are shown for clarity). Four shuttle plates are provided (again, only the shuttle plates 1306 and 1308 are shown for clarity), one shuttle plate for each column of cavities. Servo motor 218 drives both of the shuttle plates 1306,1308 through the drive shaft 222, the rack/linear rails 226,228, and the gears 320. The shuttle plates 1306,1308 are driven simultaneously in the direction of the black arrows C to drop the parts 240 into the two corresponding drop chutes. In a similar fashion, an unshown servo motor moves the other two shuttle plates in the direction of arrows D to drop the parts 240 into the drop chutes 1302,1304.

Figure 14:
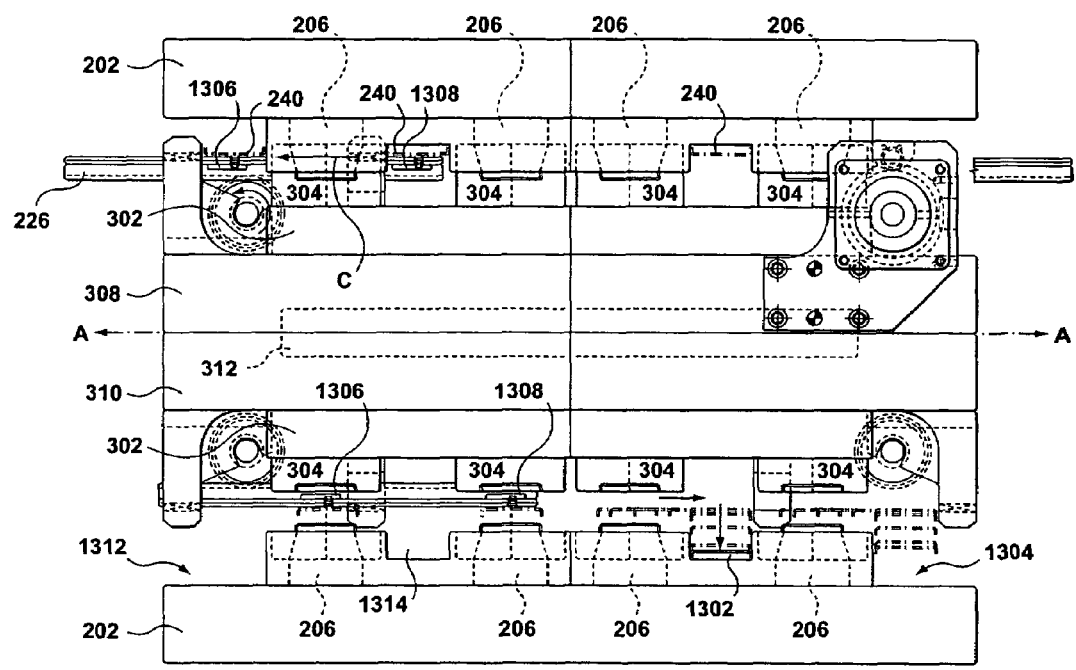
FIG. 14 is a top view of the FIG. 13 alternative.

FIG. 14 is a top view of the FIG. 13 embodiment. In the bottom half of the figure, the mold halves are shown in the open position, and four drop chutes 1302,1304,1312, and 1314 are shown. The shuttle plates 1306,1308 move horizontally between their respective pick positions to their respective drop positions to drop the parts 240 into the drop chutes. In the top half of the figure, for illustrative purposes only, the mold halves are shown in their closed positions. Note how the core half and the cavity half have cut-out portions to enable the shuttle plates and their drive mechanisms to park while the mold halves are closed.

Figure 15:
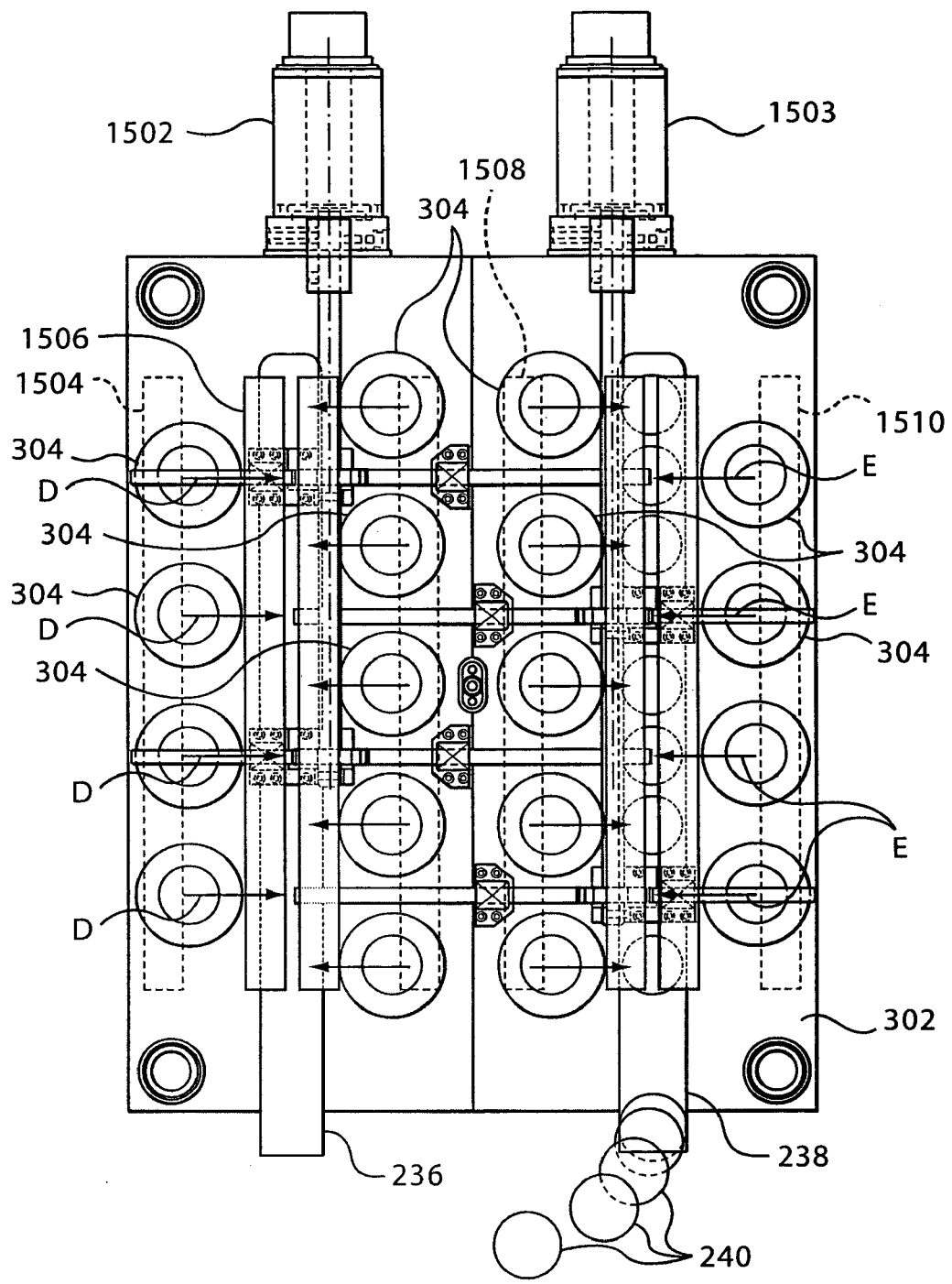
FIG. 15 is a plan view of yet another alternative of the first embodiment of the present invention.

FIG. 15 is a top view of yet another alternative of the FIG. 2 embodiment. In this alternative, the stacks of cavities are offset or staggered to allow adjacent rows of parts 240 to be transferred to a common drop chute 236,238 minimizing the mold size and thereby conserving machine space and further reduce the machine footprint. A servo motor 1502 drives shuttle plates 1504 and 1508 in the direction of arrows D, while servo motor 1503 drives shuttle plates 1506 and 1510 in the direction of arrows E. The driving of the servo motors 1502 and 1503 is synchronized so that the parts 240 from alternate columns of cavities are dropped into the same drop chute. This way, only two drop chutes 236,238 are required to evacuate the parts 240 from four columns of cavities or cores. This is called "compressing" four rows of cavities into two rows of output. Note that this configuration allows all of the rack/linear rail structure to be disposed within the periphery of the cavity plate 302.

Figure 16:
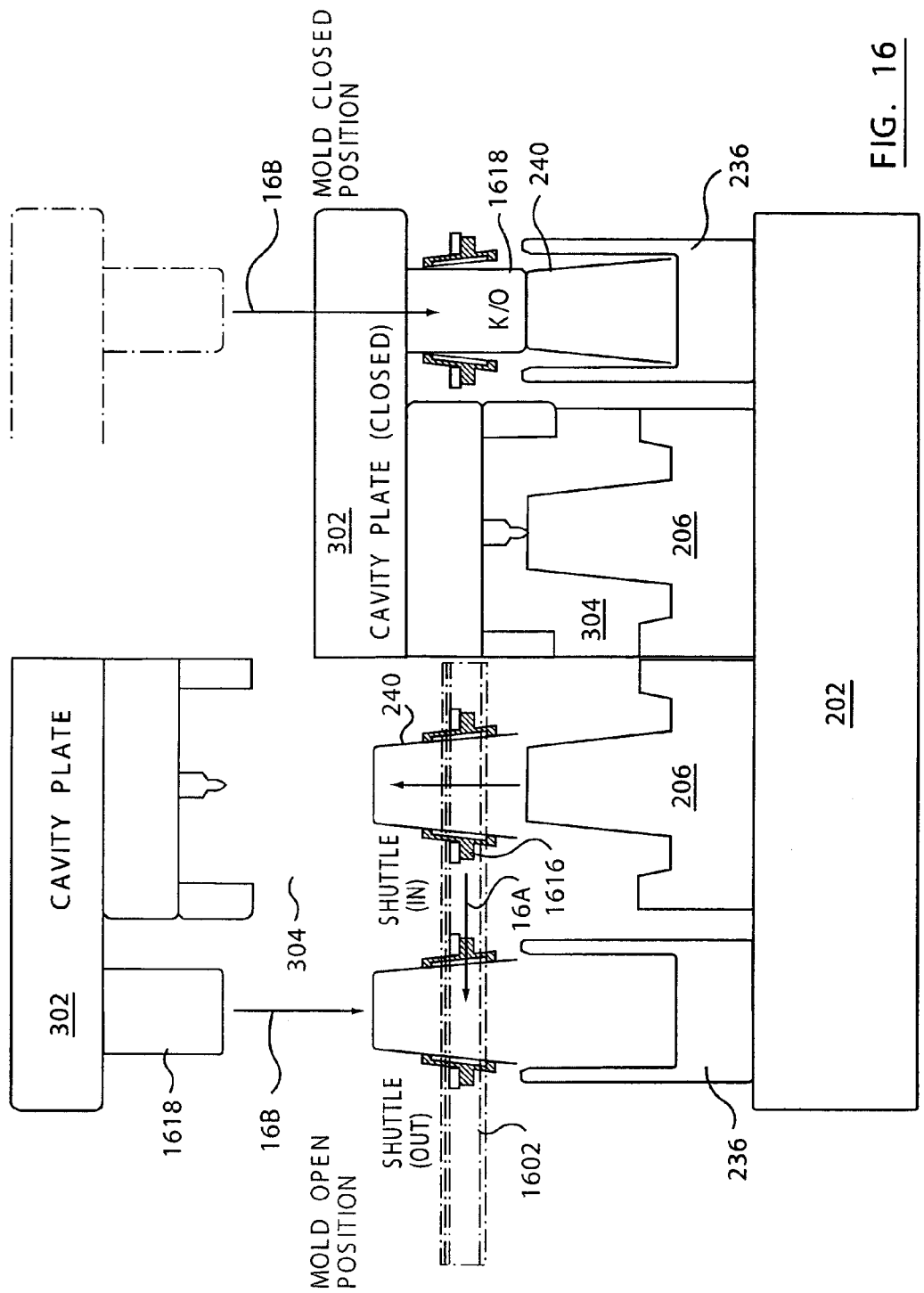
FIG. 16 is a schematic plan view of a close-up of another alternative of the first embodiment of the present invention.

FIG. 16 is a side view of another alternative of the FIG. 2 embodiment for handling a part with a relatively shallow draft (e.g. cup). The shuttle plate 1602 includes a jig 1616 which receives and traps the molded part 240, either during a mold-close stroke or propelled by the stripper ring (not shown). The shuttle plate 1602 then moves the jig 1616 in the direction of arrow 16A, where it is positioned above the drop chute 236. The mold closing stroke (or an intermediate stroke) causes a knockout mandrel 1618 to engage the molded part 240, thereby releasing the part 240 into the drop chute 236, as indicated by the arrows 16B.

Figure 24:
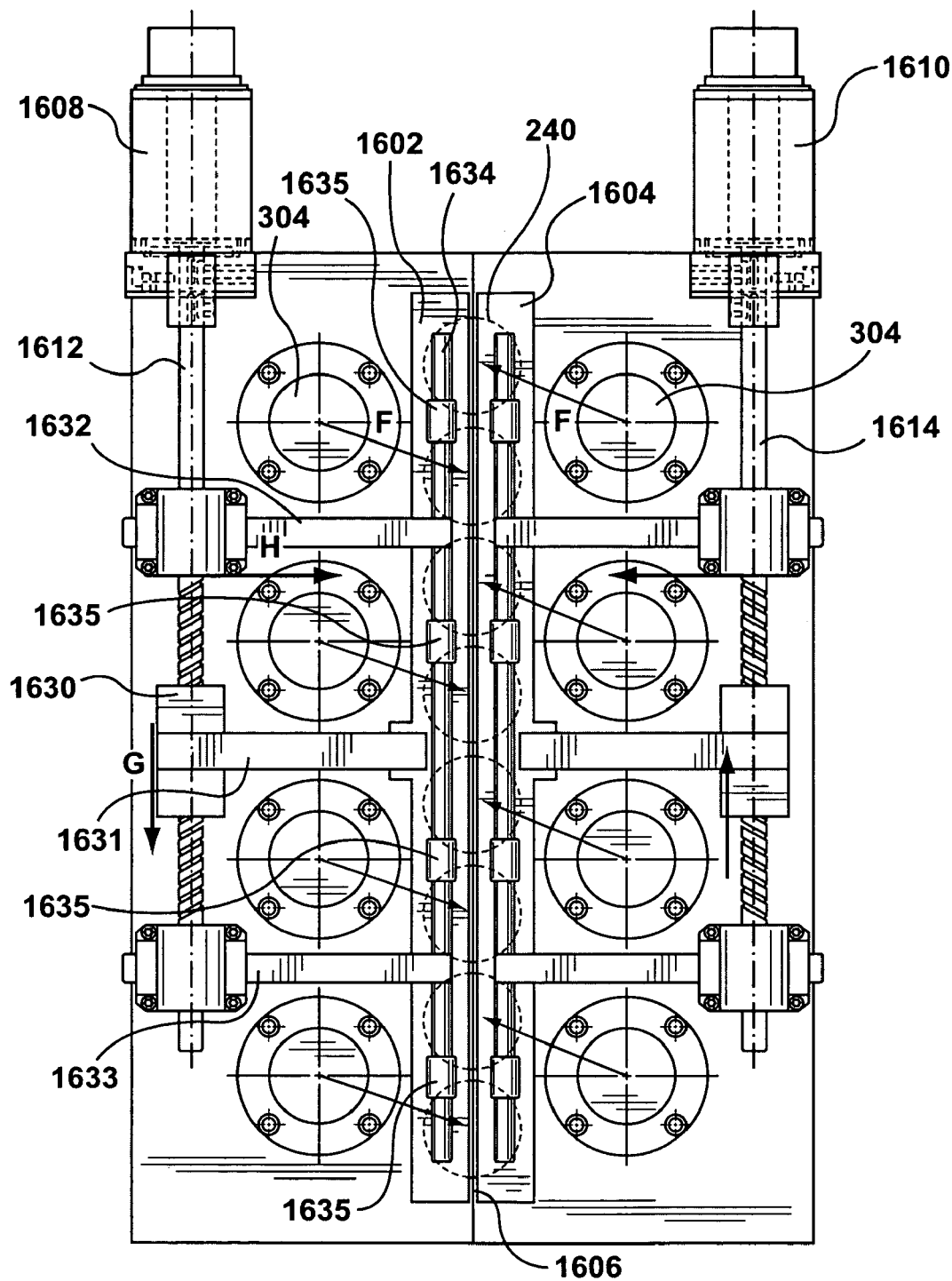
FIG. 24 is a plan view of still another alternative of the FIG. 2 embodiment.

FIG. 24 is a plan view of still another alternative of the FIG. 2 embodiment. In this alternative, the rows of cavities 304 are not staggered but are substantially aligned with each other. The cavities 304 each include a mold surface for forming molded articles thereon. The molding machine side shuttle apparatus may also be generically referred to as a "molded article shuttling apparatus". It will be appreciated that in a variation, the molded article shuttling apparatus may also be used to remove molded articles from mold cores each presenting a mold surface thereon (not depicted). The shuttle plates 1602,1604 may also be referred to generically as "shuttle bodies". The shuttle plates (or shuttle bodies) 1602,1604 are configured to have a portion that is always disposed inboard of a perimeter of the first mold half of the molding machine. The shuttle plates 1602,1604 are used to remove a row of molded articles, and each molded article that is removed is located on a respective mold surface of the row of mold surfaces. For example, each molded article is removed from a respective mold cavity 304 of the row of mold cavities.

A drive structure (to be described in more detail below) is used to drive the shuttle plates 1602, 1604 while the shuttle plates hold onto the removed row of molded articles. The shuttle plates are driven only in one plane across a molding face of the first mold half and along a direction (arrows F) that is diagonally aligned with respect to the alignment of the row of mold cavities 304 over to a respective molded article drop off position included in a single drop chute 1606. The driving may be accomplished by one or more stepped diagonal motions, or sequential orthogonal motions, or a combination of these motions. In the drop off position, the molded articles 240 are in position to be released from the shuttle plates 1602,1604 so that when released, the molded articles drop down a drop-off chute 1606. The technical effect of this arrangement is to permit usage of an aligned drop off chute 1606 versus dropping off many adjacent rows of parts 240 in to many drop-off chutes as shown in FIG. 2.

The drive structure that performs this diagonal motion is accomplished by the servo motors 1608 and 1610 that drive respective helical/screw drive shafts 1612 and 1614, either simultaneously or sequentially, or in a stepped fashion as needed. In the preferred embodiment, the drive screw shaft 1612 engages a drive nut 1630 upon which is mounted an arm 1631 that connects to the shuttle plate 1602 such that when the shaft 1612 rotates in a first direction, the drive nut 1630 moves the arm 1631 and the plate 1602 in the direction of arrow G (vertically downward in the drawing). Simultaneously, the rotation of screw shaft 1612 also drives rack/linear rails 1632, 1633, as previously described, so that the rack moves in the direction of arrow H (horizontally in the drawing). A vertical rod 1634 is fastened to the end of the two rails 1632, 1633 and passes through bearings 1635 that are mounted on the shuttle plate 1602. The pitch of the screw 1612 and nut 1630, and the gear ratio of the gear/rack drive are selected so that upon rotation of shaft 1612 their combined actions cause shuttle plate 1602 to move along an appropriately angled path (arrow F) to cause the part 240 to be moved from its ejected position adjacent the core to its drop position aligned with the drop chute 1606 and between adjacent parts from other cores. Reversing the direction of rotation of shaft 1612 causes the shuttle plate 1602 to return from the drop position to the pick up position. Servo motor 1610 drives shaft 1614 to move shuttle plate 1604 on the opposed side of the mold in a complementary manner.

Figure 25:
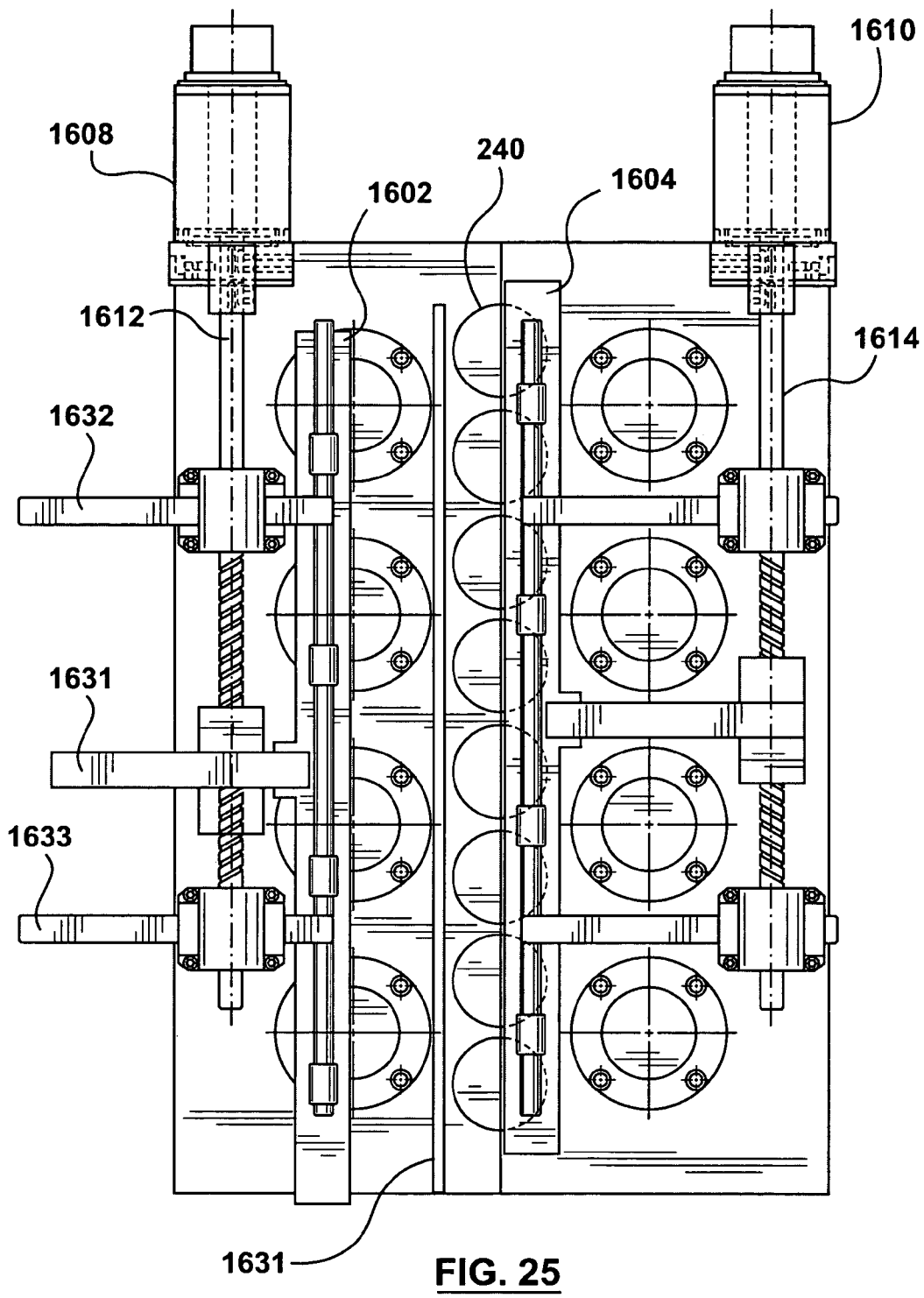
FIG. 25 is a second plan view of FIG. 24 embodiment.

FIG. 25 is a second plan view of the FIG. 24 embodiment showing the shuttle plate 1602 in a pickup position, and the shuttle plate 1604 in a drop-off position to better illustrate their movements. This configuration allows two columns of molding surfaces to mold two separate columns of parts which are then simultaneously dropped into a single drop chute 1606. This alternative may be expanded so that each servo motor drives multiple shuttle plates. Note that the shuttle plate 1602 holds the molded articles in an offset manner. Note that a chute side wall 1631 is used to form part of the drop off chute 1606.

Figure 26:
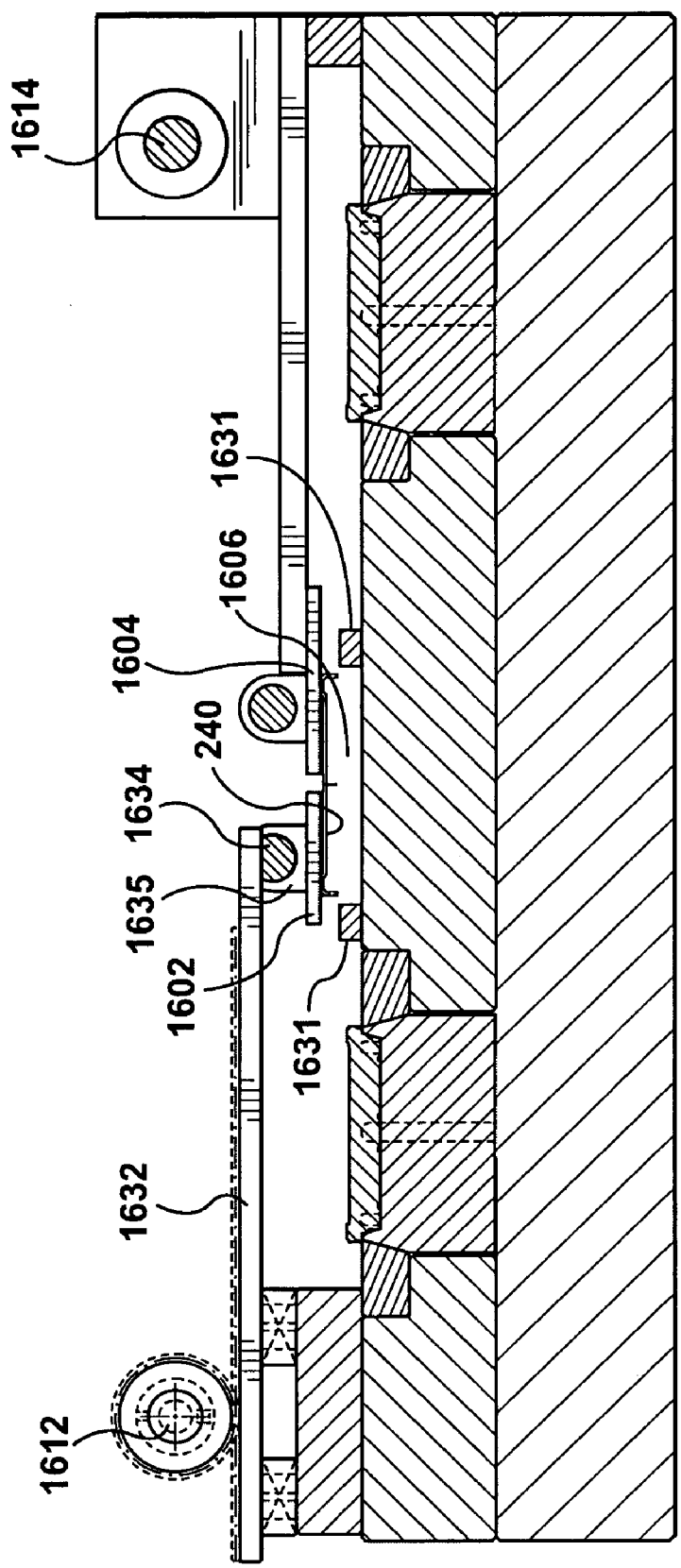
FIG. 26 is a top view of FIG. 24 embodiment.

FIG. 26 is a bottom view of the FIG. 24 embodiment. Side walls 1631 are disposed on each side of the row of articles 204 to be released, and the walls 1631 extend from the mold but do not interfere with the lateral movements of the molded articles being shuttled by the shuttles 1602,1604. The shuttles 1602 and 1604 in combination with the side walls 1631 form the drop off chute 1608. When the articles are released, they will drop within the envelope formed by the combination of the shuttles 1602,1604 and the walls 1631. In this view, while it may appear that the shuttles 1602 and 1604 hold onto a single molded article 240, that is not the case. The shuttles 1602 and 1604 hold molded articles such that the articles are held in an interleaved relationship with respect to each other along the face of the mold. The shuttle 1602 holds onto its column of molded articles while the shuttle 1604 holds onto its own column of molded articles. Each shuttle 1602,1604 holds its respective column of molded articles offset from the centers of each respective column of molded articles.

3. The Structure of the Lid-Closing Tooling

Figure 17:
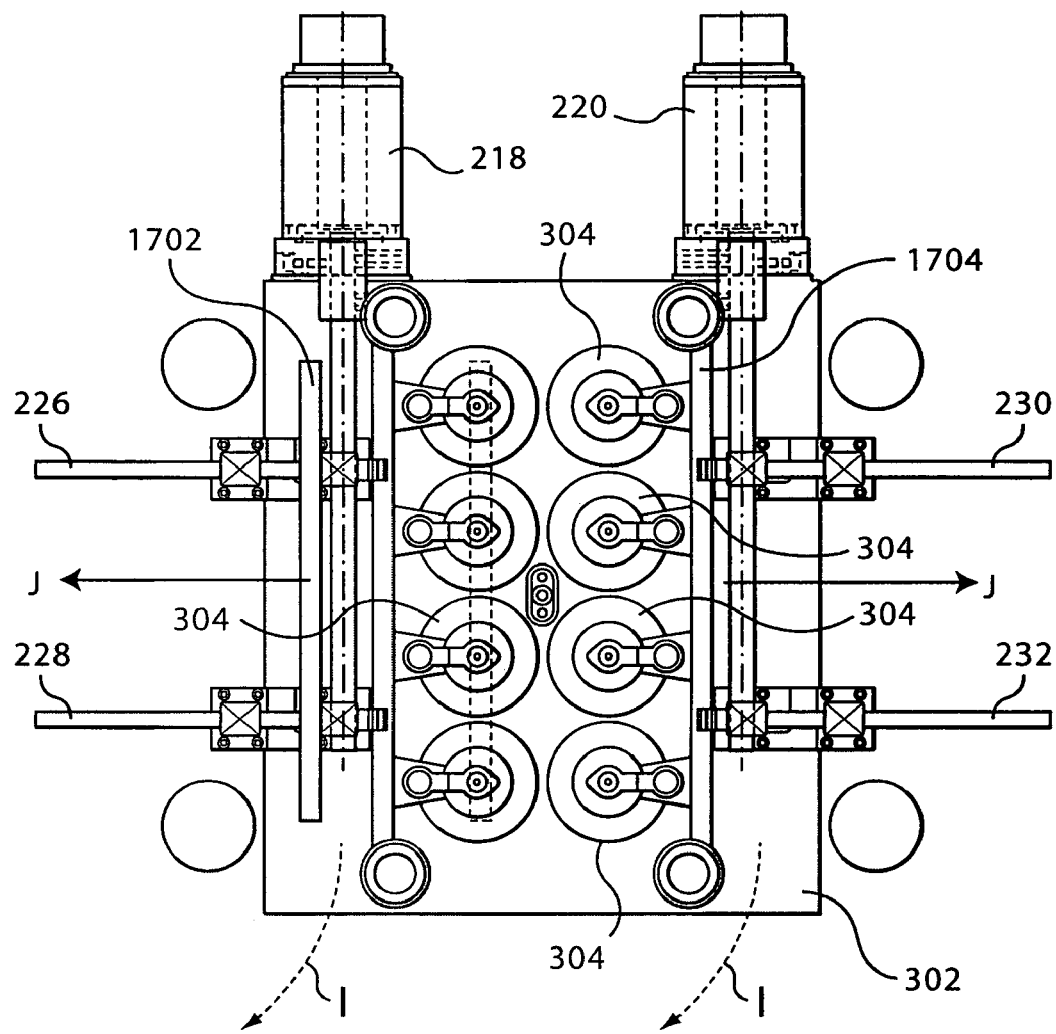
FIG. 17 is a plan view of a second embodiment of the present invention.

FIG. 17 is a plan view of a second embodiment of the servo side shuttle according to the present invention. In this embodiment, the servo side shuttle mechanism is used for another in-mold operation, such as closing and/or snapping and/or moving a lid on a molded plastic container. While this embodiment will be described with respect to a two-shuttle-plate, two-column-cavity embodiment, any of the above-described alternatives of the FIG. 2 embodiment may be adapted for use in this embodiment as well.

In FIG. 17, servo motors 218,220 drive the respective drive shafts 222,224, the rack/linear rails 226,228,230,232, and the shuttle plates 1702,1704, in a manner generally similar to that described above with respect to FIG. 2. Molded parts (not shown) are dropped into two drop chutes (also not shown) for evacuation in the direction of arrows I. The movement of the shuttle plates 1702 and 1704 in the direction of arrows J causes lids 241 on the parts 240 on the cores 206 to be partially or fully closed, as will be described in greater detail with respect to FIG. 18.

Figure 18:
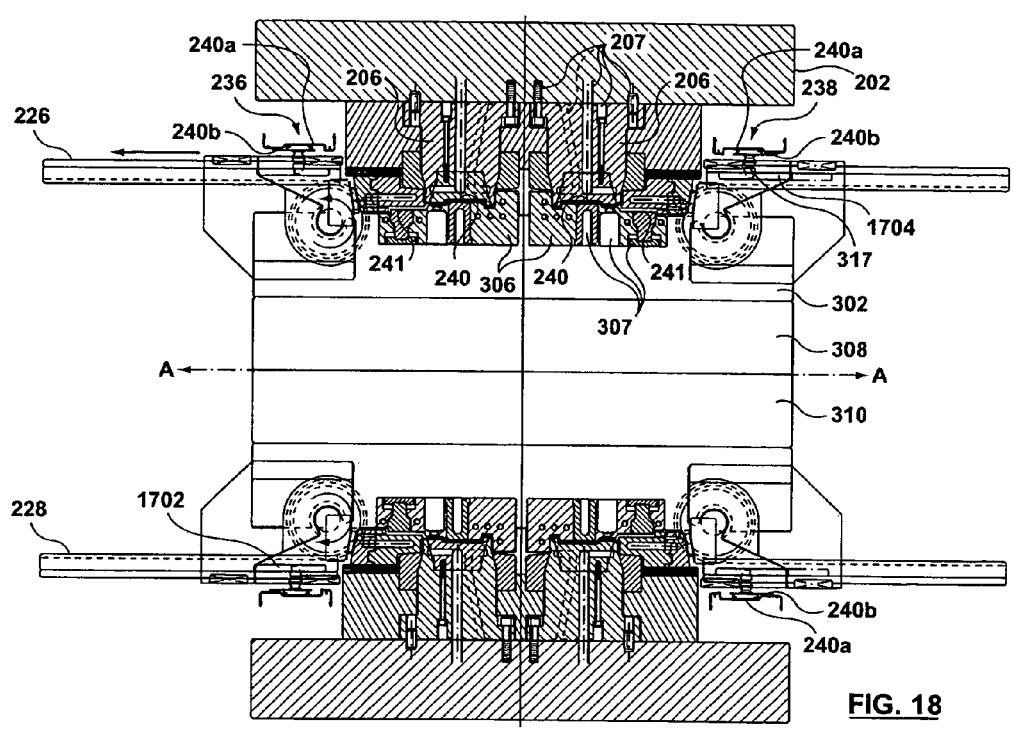
FIG. 18 is a top view of the second embodiment.

FIG. 18 is a top view of the FIG. 17 embodiment showing the mold halves closed. Core plate 202 includes cores 206, each core being shown with appropriate molding structure 207 therein, such as dowels, core caps, retainer screws, cooling channels, etc. The cavity plate 302 includes a plurality of cavities 306, each including appropriate molding structure 307 therein, such as cooling channels, injection nozzles, hot runners, etc. In the upper right portion of the drawing, the shuttle plate 1704 is shown positioned over the drop chute 238, with suction cup 316 having just released part 240. Note that the part 240 includes a body 240*a* and a closed lid 240*b*.

Figure 19:
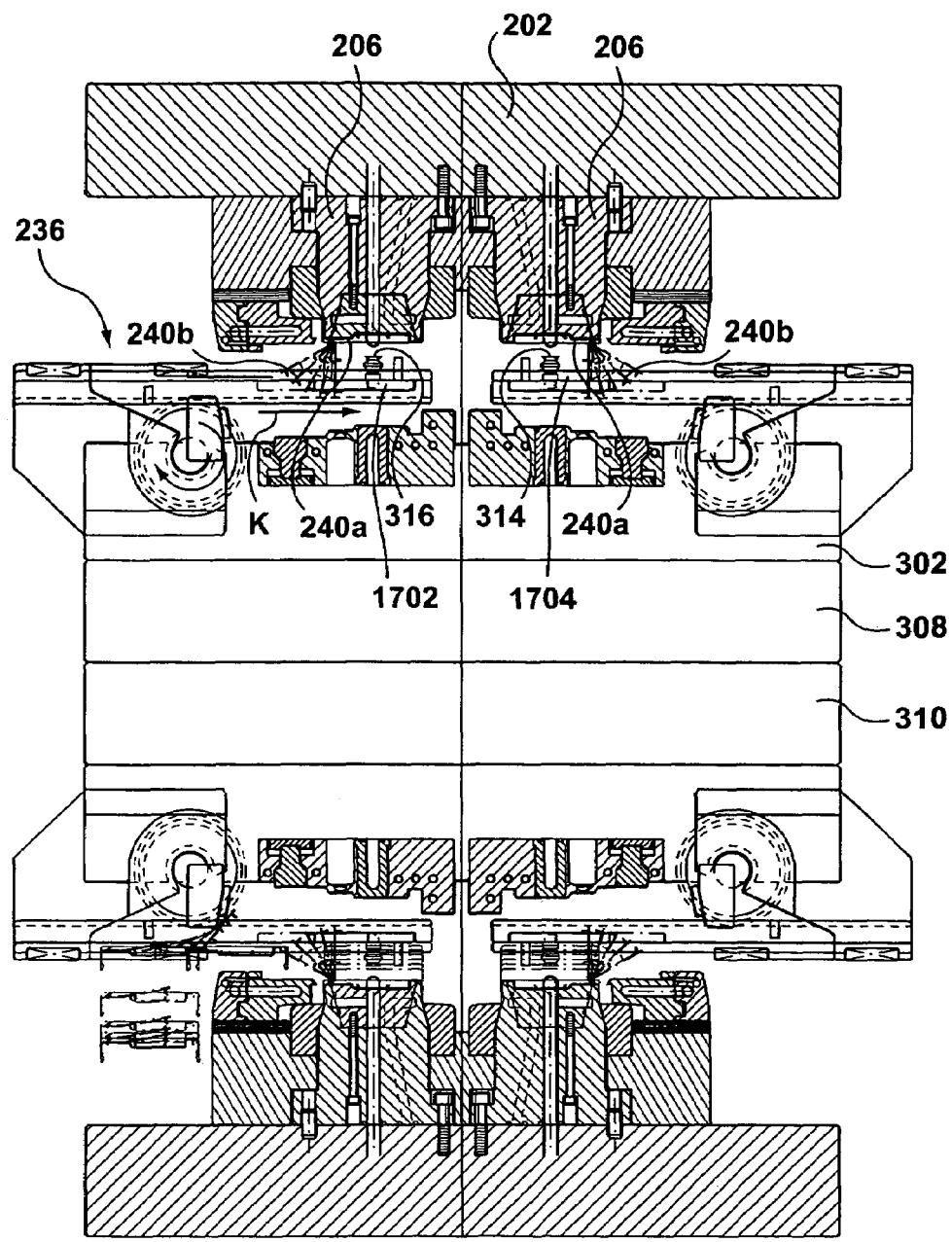
FIG. 19 is another top view of the second embodiment.

FIG. 19 is a top view of the FIG. 17 embodiment showing the mold halves open. Note that when the shuttle plate 1702 moves in the direction of arrow K, some portion of the shuttle plate (to be described more fully below) contacts the edge of lid 240*b* and swings it in a counterclockwise direction to a position where the lid is at an angle of about 90 degrees with respect to the main portion of the part body 240*a*. The part 240 is then stripped from the core 206 onto the suction cup 316, and the shuttle plate 1702 will then move linearly to the drop position, the lid 240*a* will be snapped closed by closing structure (described in detail below), and the part 240 will be dropped into drop chute 236.

Figure 20:
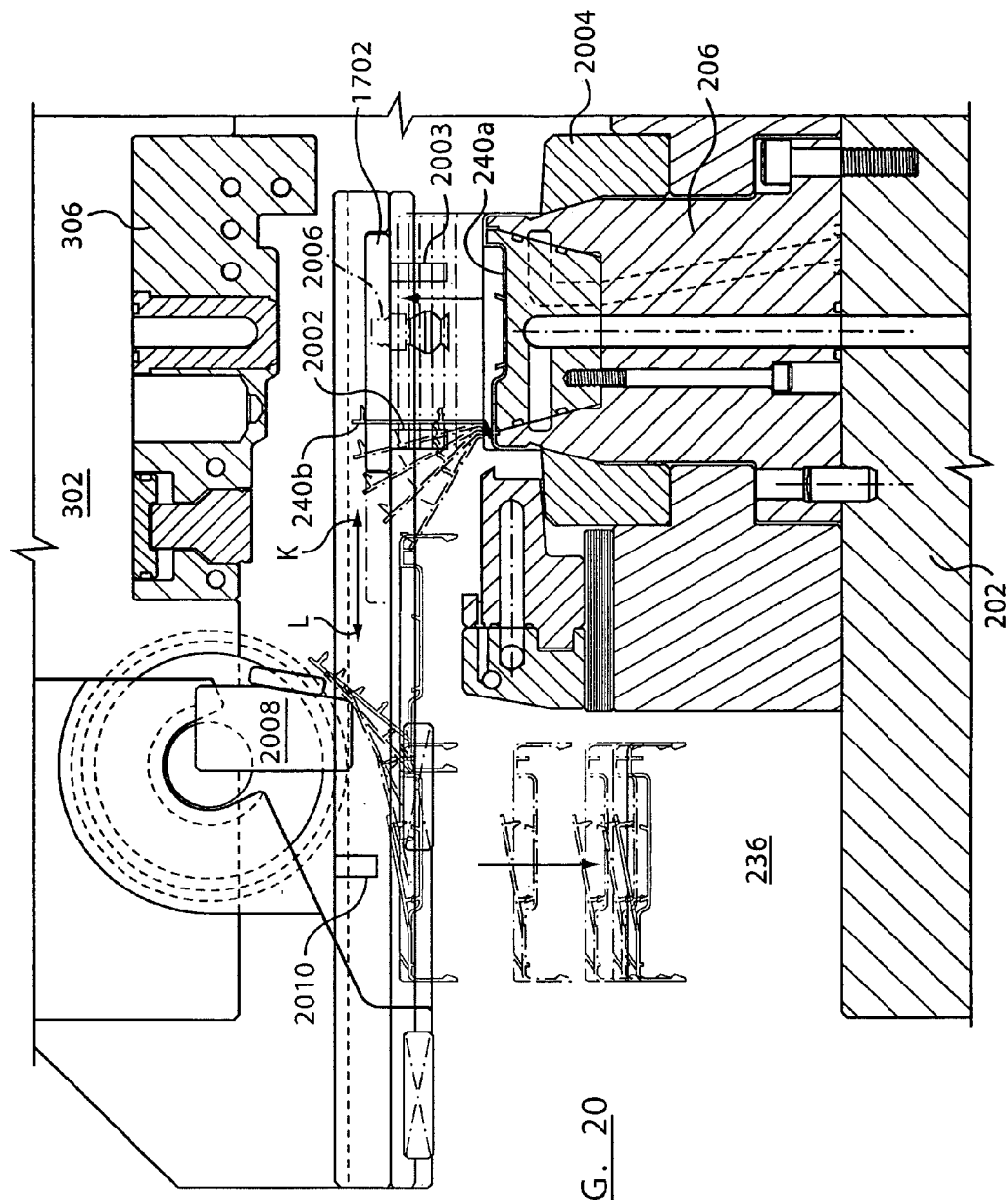
FIG. 20 is a further top view of the second embodiment.

FIG. 20 is a blown up view of the FIG. 17 embodiment, in which the cavity plate 302 and the core plate 202 are in the open position. The FIG. 20 structure can be operated in at least two alternatives. In alternative #1, a pick-up tab 2002 is coupled to the shuttle plate 1702 and picks-up the edge of lid 240*b* and swings it to the 90 degrees position when the shuttle plate 1702 moves in the direction or arrow K. Then, a stripper ring 2004 moves upward and forces the part body 240*a* into contact with a collapsing suction cup 2006. When the shuttle plate 1702 is retracted in the direction of arrow L, a closing bar 2008, which is mounted on the cavity plate 302, pushes the lid from the 90 degrees position to a position of about 175 degrees (from it's initial fully open position). Thereafter, when the mold halves close again, a closing tab 2010, which is also mounted on the cavity plate 302, snaps the lid 240*b* shut, using the pronged protrusions shown in the figure. This same mold-closing motion also strips the part 240 from the suction cup 2006 and drops it into the drop chute 236. Of course, the location of the pick-up tab may be varied to close the lid to any desired position, preferably one between about 90 degrees and about 175 degrees. The closing tab 2010 could also include an actuator for applying a supplemental closing force to the lid 240*b*.

In alternative #2 of FIG. 20, the pick-up tab 2003 is disposed to the right of the suction cup 2006, so that the motion of shuttle plate 1702 in the direction of arrow K causes the lid 240*b* to be rotated clockwise to a position of approximately 175 degrees. Then, as the stripper ring 2004 pushes the part 240 onto the collapsing suction cup 2006, the lid 240*b* is snapped shut, and the shuttle plate moves in the direction or arrow L to drop the part 240 into the drop chute 236. It is also possible that the lid is not snapped shut when the suction cup 2006 grasps the part 240, and in this instance, the closing tab 2010 could be used to snap the lid 240*b* shut before the part is dropped into the drop chute 236.

4. The Structure of the In-Mold Labeling Tooling

Figure 21:
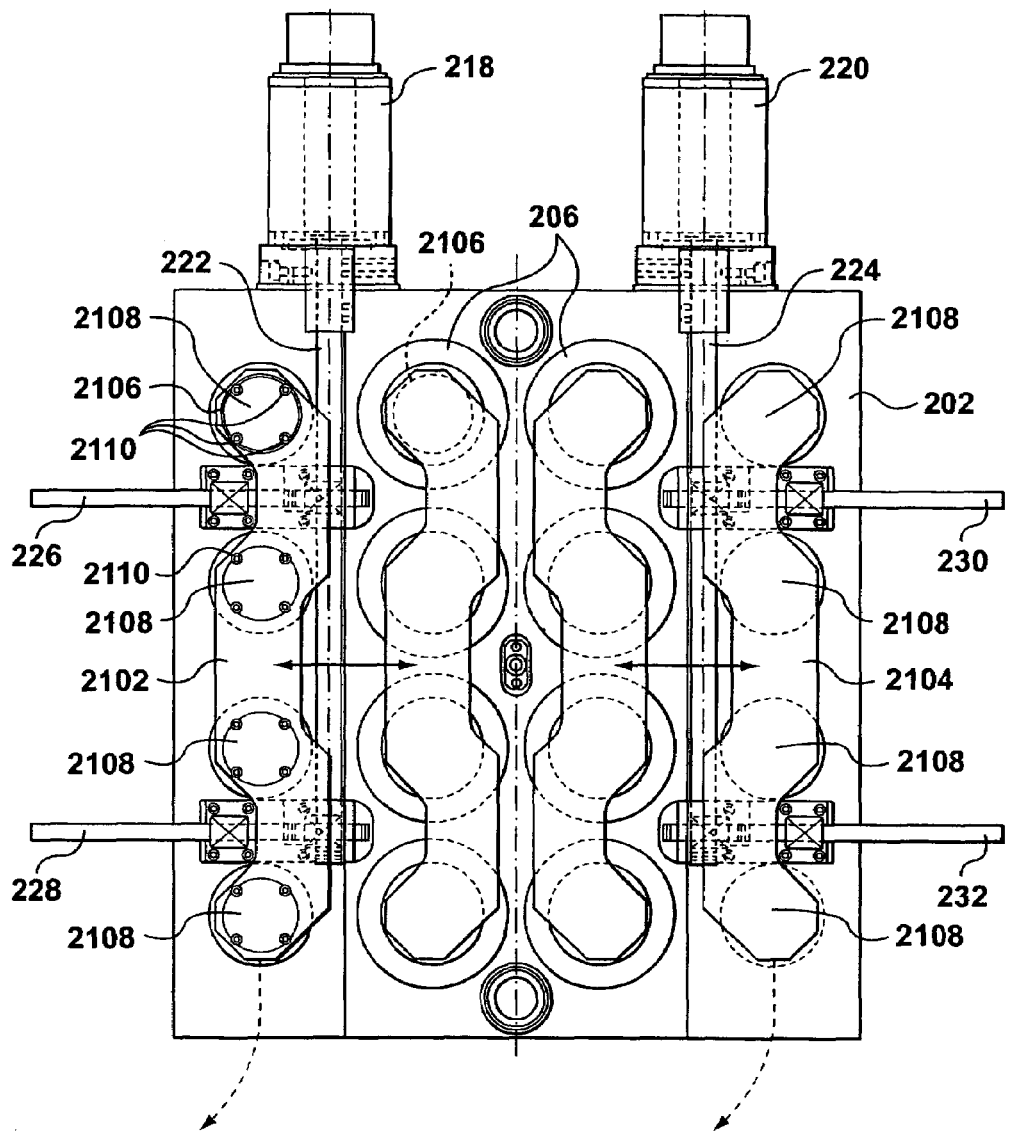
FIG. 21 is a plan view of a third embodiment of the present invention.

FIG. 21 is a plan view of a third embodiment of the present invention in which the shuttle plate is used to deposit a label into the cavity before the molten plastic is injected therein. While this embodiment will be described with respect to a two-shuttle-plate, two-column-cavity embodiment, any of the above-described alternatives of the FIG. 2 embodiment may be adapted for use in this embodiment as well. In the preferred stack mold, the servo motors 218,220 drive the drive shafts 222,224 which, in turn, drive the rack and pinion mechanism 226,228,230,232 that moves serpentine-shaped shuttle plates 2102 and 2104 into an open mold. There, a vacuum receiving mandrel and/or a suction cup on each shuttle plate receives the parts 240 from the cavities 304. Each of the shuttle plates 2102,2104 then moves out of the mold and the mandrel transfers the molded parts to a vacuum belt conveyor (not shown) or a drop chute. When the shuttle plates 2102,2104 are in their outboard position (when the mold halves are again closed), a floating plate 2106 attached to each shuttle plate (in a manner to be described more fully below) moves over a work piece receptacle 2108 and picks up a work piece for later transmission to the mold cavity.

In the present embodiment, the work piece comprises a label which will be affixed to the outside of the molded plastic container in a manner described below. However, the work piece may comprise other materials such as a container lid, a molded insert, a temperature sensitive element, electronic circuitry, batteries, filter element, diaphragm, etc., or any other device which may be useful in the finished product. The work piece receptacle 2108 preferably includes four vacuum ports (not shown) which are used to retain the labels in the receptacle. The work piece may be inserted into the mold cavity (or core) before the injection step, after the injection step, or in between injections of different layers (or other structure) of the molded article.

Figure 22:
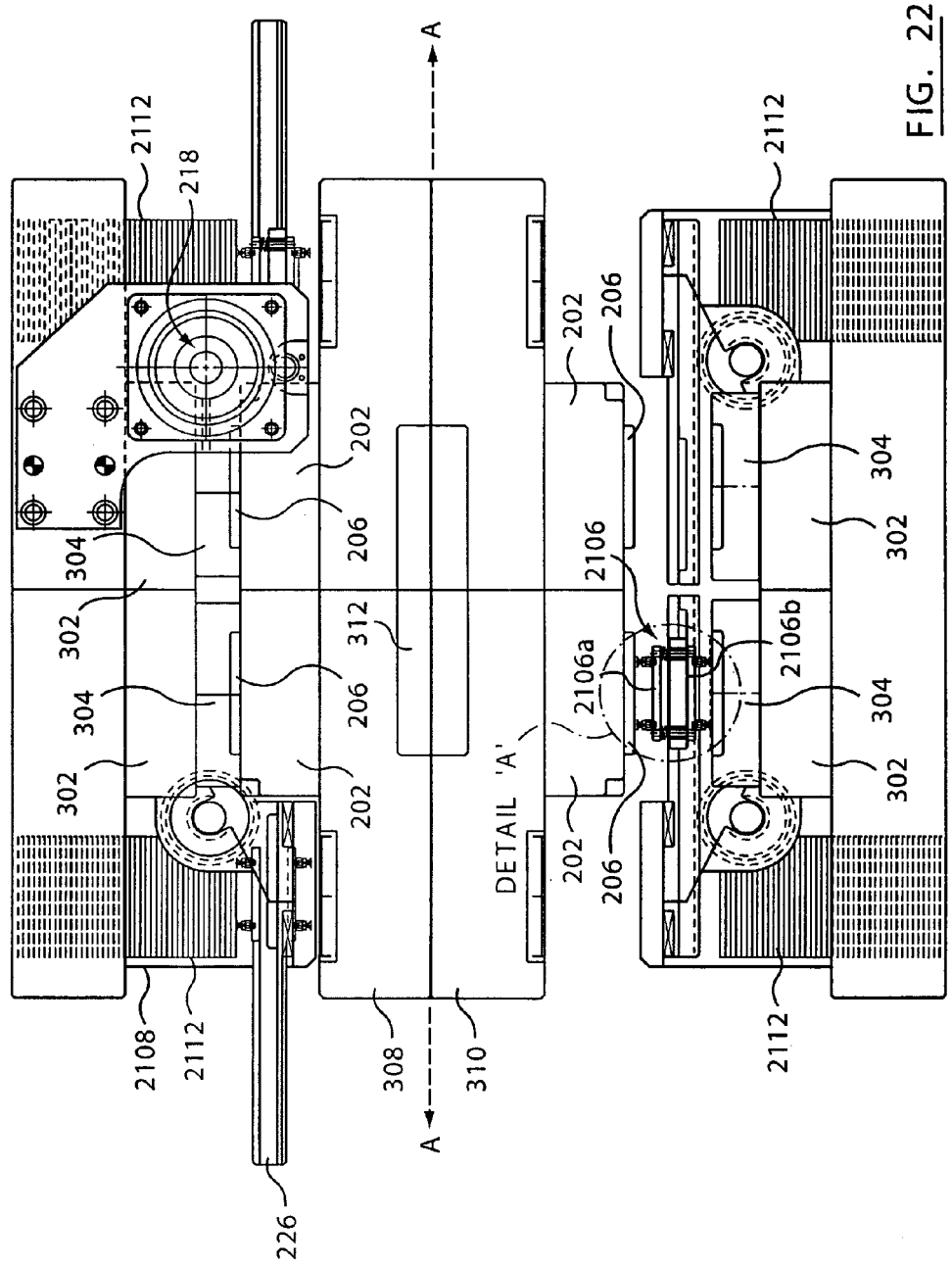
FIG. 22 is a detailed schematic view of the third embodiment.

FIG. 22 is a detailed schematic view of the FIG. 21 embodiment showing that each floating plate assembly 2106 comprises an upper plate 2106a and a lower plate 2106b. For illustration purposes only, the top half of FIG. 22 illustrates the mold in the closed configuration with the side shuttle parked, and the bottom half of FIG. 22 illustrates the mold in the open configuration with the side shuttle in the pick/transfer position. In the mold open position depicted in the bottom half of the figure, the floating plates 2106a, 2106b are disposed between the core 206 and the cavity 304. The top half of FIG. 22 shows how the shuttle plate and floating plate are safely disposed in the park position when the mold halves are closed. Stacks of labels 2112 are held in receptacles 2108 by vacuum, static electricity, gravity, or any other convenient mechanism.

Figure 23:
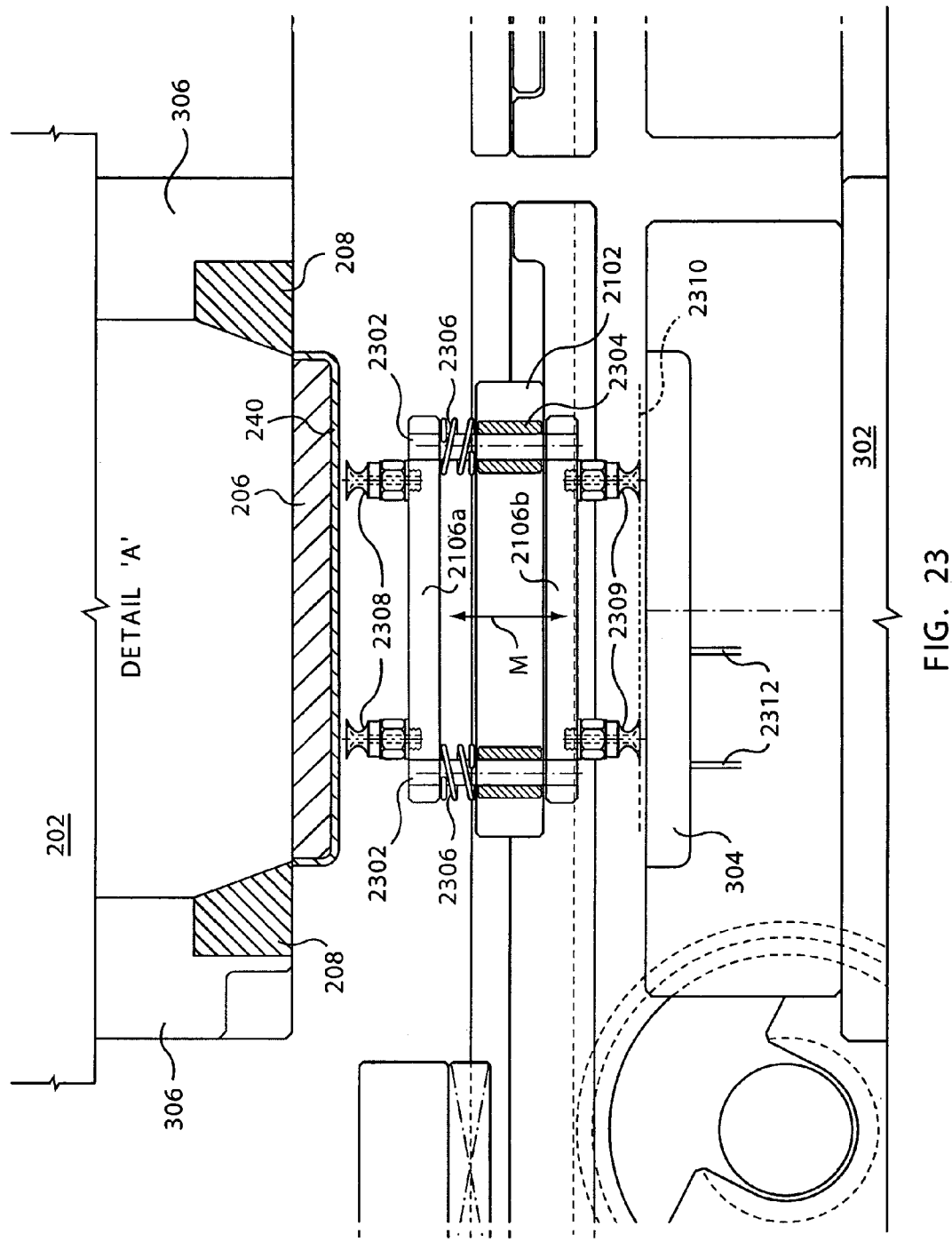
FIG. 23 is a top view of the third embodiment.

FIG. 23 is a detail view of the FIG. 22 structure. In FIG. 22, the core plate 202 and the cavity plate 302 are in the mold open position with a part 240 disposed on core 206 and about to be stripped therefrom by stripper ring 208. The floating plates 2106a,2106b are mounted on opposite sides of the shuttle plate 2102 with shafts 2302 and bushings 2304 so that the plates "float" in the direction of arrow M. Springs 2306 (or any other biasing means) are disposed between an upper surface of the shuttle plate 2102 and a lower surface of the floating plate 2106a in the manner shown to urge the floating plates to a home position with the part handling plate 2106a biased away from the shuttle plate. In operation, the parts 240 being stripped by stripper ring 208 are grasped by the suction cups 2308, the stripping action acting through the part 240 pushes the floating plates 2106a, 2106b towards the molding cavity 304 and positions the label 2310 at a predetermined location. Thereafter, the label is released from suction cups 2309 into the cavity 304 on the bottom (or other desirable surface location, e.g., the side) of cavity 304, the stripper ring 208 is retracted, the floating plates 2106a, 2106b return to their home position, and the shuttle plate is retracted to the part drop position. The stripping action could alternatively be coupled between the floating plates 2106a, 2106b through pins (not shown) that engage the stripper ring 208. The label may be held in place in the cavity 304 by means of vacuum channels 2312 or other retaining means such as electrostatic charge.

In summary, the stripper ring 208 moves the floating plates 2106a, 2106b downwardly as it ejects the parts 240 until the lower floating plate 2106b reaches the bottom of the mold and the labels 2310 held by the suction cups 2309 can be transferred to the mold at the same time as the previously molded parts 240 are transferred to the suction cups 2308. When the floating plates 2106a, 2106b are back in the home position, the main shuttle 2102 is retracted from the mold and the parts 240 are discharged into the drop chute and labels 2310 are loaded onto the suction cups 2309 to prepare the shuttle for the next cycle.

5. The Operation

The operation of the various structures according to the present invention has been described above. The overall operation of one molding operation according to the preferred embodiments proceeds as outlined below.

Steps:
1. Inject molten plastic into the mold cavity;
2. Open mold;
   2.1. Move shuttle to the pickup position;
   2.2. Part ejection/transfer to side shuttle tooling;
      2.2.1. (optional) Work piece (e.g. label) transfer;
      2.2.2. (optional) Intermediate mold full or partial closings to effect transfers/operations;
   2.3. Move shuttle to the drop position, which may be the same or different from the parked position;
3. Close mold;
   3.1. Strip the part from the side shuttle tooling; and
   3.2. (optional) work piece (e.g. label) pickup.

6. Advantageous Features

The servo side shuttle system offers gains in a reduction in cycle time, an increase in mold cavities able to be serviced, reduced capital investment, and improved positional accuracy. Specifically:

(1) In-mold handling/labeling of molded articles requires less time since the shuttle plate is inboard of the mold, and hence has a shorter distance to travel than a robot plate that must completely exit the molding area. Further reduction of cycle time is possible where a multiplicity of servo side shuttles is provided on a single mold face (e.g. total horizontal travel is divided by two by having left and right side shuttles).

(2) The inboard handling of molded articles between their molding cavities and the drop chutes with the servo side shuttle is a substantially linear motion and has a reduced mold opening stroke requirement relative to inboard part handling with servo swing chutes wherein the articles are handled through a large arc and hence more space between the mold halves is required.

(3) By example, an 8.5" lid would require an opening stroke in excess of the 10-12" rotational arc to swing the part with a conventional swing chute whereas for the same part, the SSS would require only 2-3" of stroke, and thereby provide a dramatic cycle time savings from the reduced time required for mold stroking.

(4) By harnessing the movement of the mold stripper plate/ejection mechanism on the core side to interact with the shuttle plate to transfer the work piece into the mold eliminates an actuator and related controller feedback and thereby saves on cost and weight, the weight savings and controller simplification (no signal delay time for tooling plate actuator) provides potential cycle time savings.

(5) Known in-mold labeling systems are considered limited to servicing cavitations of 2×4 due to the size, weight, positional accuracy, and related stability of the robot arm, whereas the servo side shuttle is able to handle cavitations of 2×8 or higher due to a stable in-mold installation, and a lighter and more compact construction enabled by the shorter stroke distance, shuttle weight (i.e. no onboard actuators). Further, typical standalone in-mold labeling systems lose precision due to relative movements of robot/machine/mold, whereas the present invention contemplates inboard mounting (i.e. fastening everything to the mold) for improved operating accuracy.

(6) The technology is not limited to in-mold labeling, but may have more generic use for introducing inserts into the molding cavity or into the molded or partially molded article.

(7) The method of operating the side shuttle wherein the molded articles are handled from the molding cavity to the drop chute preserves the orientation of the molded article that may be advantageous for post-molding operations such as stacking/packaging. Further, the inboard installation of the side shuttle and its inherent alignment accuracy provides for the accurate orientation and placement of molding inserts such as labels.

7. Conclusion

Thus, what has been described is a servo side shuttle apparatus and method capable of providing a wide array of operations on in-mold articles, which will greatly reduce the cycle time and cost of producing molded parts.

The individual components shown in outline or designated by blocks in the attached Drawings are all well-known in the molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Any U.S. and foreign patent document discussed above is hereby incorporated by reference into the Detailed Description of the Preferred Embodiment.

What is claimed is:

1. Molding machine side shuttle apparatus, comprising:
   a shuttle plate having a portion always disposed inboard of a perimeter of a first mold half of the molding machine;
   a drive structure configured to drive said shuttle plate only in one plane across a molding face of the first mold half; and
   a plurality of gripping structures coupled to said shuttle plate and respectively configured to remove a corresponding plurality of molded articles from a corresponding plurality of mold cavities,
   said drive structure being configured to drive said shuttle plate to cause the plurality of gripping structures to be moved in a direction which is diagonal with respect to an array direction of the plurality of mold cavities.

2. Apparatus according to claim 1, wherein said drive structure is configured to drive said shuttle plate to cause the plurality of gripping structures to be sequentially moved in two orthogonal directions.

3. Apparatus according to claim 1, wherein said drive structure is configured to cause said plurality of gripping structures to simultaneously release the plurality of gripped molded articles into a single drop chute.

4. Apparatus according to claim 1, wherein said shuttle plate is configured to perform a further operation of applying a work piece to at least one of a mold core and a mold cavity.

5. Apparatus according to claim 1, wherein said shuttle plate is configured to perform a further operation of moving a lid on at least one of the molded articles.

6. Apparatus according to claim 1, wherein said shuttle plate is configured to perform a further operation of applying an insert to at least one of a molded article and a mold cavity.

7. Apparatus according to claim 1, wherein said shuttle plate has a portion that is always disposed inboard of a second mold half of the molding machine.

8. Apparatus according to claim 1, further comprising a plastic injection molding machine.

9. Molded article removal apparatus, comprising:
   a plate coupled to a first mold half of a molding machine and having a portion always disposed inboard of a perimeter of the first mold half, said plate including a removal device that is configured to grasp the molded article from at least one of a mold core and a mold cavity; and
   drive structure configured to be coupled to the plate, and configured to drive said plate (i) such that said plate is driven simultaneously in two orthogonal coplanar linear directions, and (ii) such that said removal device removes the molded article from the at least one of the mold core and the mold cavity.

10. Apparatus according to claim 9, wherein said plate comprises a plurality of shuttle plates each coupled to the mold half such that a portion of each shuttle plate is always disposed within a perimeter of the mold half.

11. Apparatus according to claim 10, further comprising a single drop chute configured to receive molded articles from each of said plurality of shuttle plates.

12. Apparatus according to claim 10, wherein at least one of said plurality of shuttle plates is always completely disposed within the perimeter of the mold portion.

13. Apparatus according to claim 9, wherein said drive structure comprises:
   a servo motor;
   a drive shaft coupled to said servo motor;
   a gear coupled to said drive shaft;
   a geared linear rail coupled between said drive shaft and said shuttle plate and configured to move in a first direction as said shaft rotates; and
   a rack device coupled to said drive shaft and configured to move in a second direction as said shaft rotates.

14. Apparatus according to claim 9, wherein the mold half comprises at least one of (i) a mold core plate having a plurality of cores disposed thereon, and (ii) a mold cavity plate having a plurality of cavities disposed thereon, and wherein said plate includes a plurality of arms disposed to access one of the plurality cores and the plurality of cavities.

15. Apparatus according to claim 14, further comprising:
   a suction cup coupled to each said arm; and
   a vacuum channel configured to provide low pressure air to each said suction cup.

16. Apparatus according to claim 9, wherein said plate includes a label application device that is configured to apply a label to an inside surface of the mold cavity.

17. Apparatus according to claim 16, further comprising a floating plate device having:
   a first floating plate disposed on a first side of said plate and having an article suction member for grasping a just-molded article from the mold core;
   a second floating plate disposed on a second side of said plate and having a label attraction member for grasping the label; and
   biasing structure disposed between said plate and at least one of said first and second floating plates, and configured to allow said first and second floating plates to move in a direction orthogonal to a plane of said plate as the mold core and the mold cavity move with respect to each other.

18. Apparatus according to claim 17, wherein said drive structure is configured to move in a first direction to (i) move the article suction member to a position adjacent a just-molded article on the mold core, and (ii) move the label attraction member, which is holding the label, to a position adjacent the mold cavity, and wherein after the article is stripped from the mold core, said drive structure is configured to move in a second direction to (iii) move the article suction member to a position to eject the just-molded article from the mold, and (iv) move the label attraction member to a position adjacent a label feed location.

19. Apparatus according to claim 18, further comprising retention structure disposed adjacent the mold cavity and configured to retain the label within the mold cavity after the mold has closed.

20. Molded article removal apparatus, comprising:
a first shuttle plate configured to be coupled to a mold portion, and including a first plurality of molded article gripping devices that are configured to remove a corresponding first plurality of molded articles from one of (i) a first plurality mold cores and (ii) a first plurality of mold cavities;
a second shuttle plate configured to be coupled to the mold portion, and including a second plurality of molded article gripping devices that are configured to remove a corresponding second plurality of molded articles from one of (i) a second plurality mold cores and (ii) a second plurality of mold cavities; and
drive structure configured to be coupled to the mold portion, and configured to drive said first and second plates in opposite directions, each opposite direction being diagonal to an array direction of one of (i) the first plurality mold cores and (ii) the first plurality of mold cavities.

21. Apparatus according to claim 20, wherein said drive structure is configured to drive said first and second plates such that the first plurality of molded article gripping devices and the second plurality of molded article gripping devices are substantially co-linear over a drop chute.

22. Apparatus according to claim 20, wherein said drive structure comprises:
first and second servo motors;
first and second drive shafts respectively coupled to said first and second servo motors;
first and second rail devices, respectively coupled to said first and second drive shafts, and configured to respectively drive said first and second shuttle plates in opposite directions; and
first and second rack devices, respectively coupled to said first and second drive shafts, and configured to respectively drive said first and second shuttle plates toward each other.

23. A injection molding machine, comprising:
a mold cavity plate having a plurality of mold cavities;
a mold core plate having a plurality of mold cores;
a driver for opening and closing the mold core plate and the mold cavity plate with respect to each other;
injection structure configured to inject molten plastic into said plurality of mold cavities;
molded part evacuation structure configured to evacuate molded articles from the injection molding machine; and
a shuttle device configured to move linearly between the mold core plate and the mold cavity plate when they are separated by a predetermined clearance, said shuttle device being configured to extract a plurality of molded articles from the plurality of cavities or the plurality of cores, said shuttle device having at least a portion thereof inboard of a periphery of the mold cavity plate when the mold core plate and the mold cavity plate are in the closed position, said shuttle device configured to move diagonally with respect to an array direction of said plurality of mold cavities.

24. An injection molding machine according to claim 23, further comprising lid-closing structure coupled to said shuttle device and configured to close a lid of a molded article when the molded article is resident on either the corresponding mold cavity or the corresponding mold core.

25. Molding machine side shuttle apparatus, comprising:
shuttle means having a portion always disposed inboard of a perimeter of a first mold half of the molding machine, for shuttling between the first mold half and a second mold half when the mold halves are in an open position;
drive means for driving said shuttle means linearly, whereby said shuttle means is moved only linearly across the molding face of the first mold half; and
operation means coupled to said shuttle means and configured to remove a molded article from one of a mold core and a mold cavity
said drive means also for driving said operation means in a direction diagonal to an array direction of the one of a mold core and a mold cavity.

26. In a molding machine having a first mold half presenting a row of mold surfaces substantially aligned with each other and configured to form molded articles thereon, a molded article shuttling apparatus, comprising:
a shuttle body configured to have a portion always disposed inboard of a perimeter of the first mold half of the molding machine, and to remove a row of molded articles, each molded article being located on a respective mold surface of the row of mold surfaces; and
a drive structure configured to drive the shuttle body having the removed row of molded articles only in one plane across a molding face of the first mold half and along a direction diagonally aligned with respect to the alignment of the row of mold surfaces.

27. Apparatus according to claim 26, wherein the each mold surface is formed within a respective mold cavity.

28. Apparatus according to claim 26, wherein the each mold surface is formed on a respective mold core.

29. Apparatus according to claim 26, wherein said shuttle body is configured to perform a further operation of moving a lid on at least one of the molded articles.

30. Apparatus according to claim 26, wherein said shuttle body is configured to perform a further operation of applying an insert to at least one of a molded article or the mold surface.

31. Apparatus according to claim 26, further comprising:
a second shuttle body configured to remove a second row of molded articles from the first mold half; and
a single drop chute configured to receive molded articles from each of said shuttle body and said second shuttle body.

32. Molded article shuttling apparatus comprising:
a shuttle body configured to: (i) have a portion always disposed inboard relative to a perimeter of a first mold half of a molding machine, the first mold half having a row of mold surfaces substantially aligned with each other and configured to form molded articles thereon; and (ii) remove a row of molded articles, each molded article being located on a respective mold surface of the row of mold surfaces; and
a drive structure configured to drive the shuttle body having the removed row of molded articles only in one plane across a molding face of the first mold half and along a direction being diagonally aligned with respect to the alignment of the row of mold surfaces.

33. Apparatus according to claim 32, wherein the each mold surface is formed within a respective mold cavity.

34. Apparatus according to claim 32, wherein the each mold surface is formed on a respective mold core.

35. Apparatus according to claim 32, wherein said shuttle body is configured to perform a further operation of moving a lid on at least one of the molded articles.

36. Apparatus according to claim 32, wherein said shuttle body is configured to perform a further operation of applying an insert to at least one of a molded article or the mold surface.

37. Apparatus according to claim 32, further comprising:
  a second shuttle body configured to remove a second row of molded articles from the first mold half; and
  a single drop chute configured to receive molded articles from each of said shuttle body and said second shuttle body.

38. A method of removing a plurality of molded articles from one of (i) an array of mold cavities, and (ii) an array of mold cores, comprising the steps of:
  driving a shuttle plate in between a mold core half and a mold cavity half to a position where a plurality of grippers coupled to the shuttle plate may remove the plurality of molded articles from the one of (i) the array of mold cavities, and (ii) the array of mold cores;
  using the grippers to grip the molded articles and remove them from the one of (i) the array of mold cavities, and (ii) the array of mold cores; and
  driving the shuttle plate in a direction diagonal to an array direction of the one of (i) the array of mold cavities, and (ii) the array of mold cores, to a substantially co-linear position over a single drop chute.

* * * * *